(12) United States Patent
Lida et al.

(10) Patent No.: US 7,822,879 B2
(45) Date of Patent: Oct. 26, 2010

(54) METHODS FOR ADDRESS ASSIGNMENT

(75) Inventors: Eyran Lida, Kfar Ha-Oranim (IL); Nadav Banet, Kadima (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 269 days.

(21) Appl. No.: 12/193,027

(22) Filed: Aug. 17, 2008

(65) Prior Publication Data

US 2009/0296731 A1 Dec. 3, 2009

Related U.S. Application Data

(60) Provisional application No. 61/056,432, filed on May 27, 2008.

(51) Int. Cl.
*G06F 3/06* (2006.01)
(52) U.S. Cl. .................... 710/3; 710/2; 703/24
(58) Field of Classification Search ............ None
See application file for complete search history.

(56) References Cited

U.S. PATENT DOCUMENTS

| | | | |
|---|---|---|---|
| 6,122,676 A * | 9/2000 | Brief et al. ............... 710/9 |
| 6,185,520 B1 * | 2/2001 | Brown et al. ............ 703/25 |
| 7,398,345 B2 * | 7/2008 | Larson et al. ............ 710/306 |
| 7,418,524 B2 * | 8/2008 | Beasley et al. ............ 710/2 |
| 7,433,473 B2 * | 10/2008 | Kudelski et al. ............ 380/259 |
| 7,523,241 B2 * | 4/2009 | Konishi ............... 710/302 |
| 7,730,200 B2 * | 6/2010 | Beers et al. ............ 709/231 |
| 2005/0005110 A1 * | 1/2005 | Kim et al. ............ 713/166 |
| 2006/0067690 A1 | 3/2006 | Tatum |
| 2006/0106968 A1 * | 5/2006 | Wooi Teoh ............ 710/316 |
| 2007/0192500 A1 * | 8/2007 | Lum ............ 709/230 |
| 2007/0192858 A1 * | 8/2007 | Lum ............ 726/22 |
| 2007/0220150 A1 * | 9/2007 | Garg ............ 709/226 |
| 2008/0031326 A1 * | 2/2008 | Lecomte et al. ......... 375/240.12 |
| 2008/0068287 A1 | 3/2008 | Day |
| 2008/0126577 A1 | 5/2008 | Bae |
| 2009/0073316 A1 * | 3/2009 | Ejima ............ 348/515 |
| 2010/0066906 A1 * | 3/2010 | Nakajima ............ 348/500 |

* cited by examiner

Primary Examiner—Cheng-Yuan Tseng

(57) ABSTRACT

Methods for CEC logical address assignments and HDMI physical address assignments. Some embodiments determine a required HDMI physical address to be assigned to an upstream HDMI-CEC device and provide the required HDMI physical address. Other embodiments assign consistent CEC logical addresses to a plurality of HDMI-CEC display devices in different HDMI-CEC network views.

14 Claims, 25 Drawing Sheets

METHODS FOR ADDRESS ASSIGNMENT

CROSS-REFERENCE TO RELATED APPLICATIONS

This application also claims the benefit of U.S. Provisional Patent Application No. 61/056,432, filed on May 27, 2008, incorporated herein by reference.

BACKGROUND

The HDMI™ (High-Definition Multimedia Interface) standard, of the HDMI consortium, is a digital interface for audio and video signals. HDMI-CEC refers to an HDMI device that supports CEC (Consumer Electronics Control). HDMI-CEC devices enable a user to manage a plurality of sources connected via HDMI with no special programming needed and to run operations such as 'one touch play'. Using HDMI-CEC, the user may, for example, use one remote control to turn on the TV, DVD, and receiver at the same time, and to adjust the system volume using one button.

The HDMI-CEC protocol uses a one-wire shared bus that includes automatic mechanisms for logical address allocation based on product type, arbitration, retransmission, broadcasting, and switching control. Operation code (opcode) supports both device specific and general features. CEC devices have both physical and logical addresses. Normally, upon hot-plugging, each CEC source device obtains a physical address by reading the EDID of the display device to which it is attached.

In some embodiments, an HDMI-CEC message, shortly referred to as "CEC message", includes the following CEC blocks: a special start 'bit', a header block containing source and destination addresses, a first data block containing optional opcode, and a second data block containing optional operands specific to the opcode. The maximum CEC message size (header block plus opcode block plus operand blocks) is 16*10 bits. Each CEC block includes 8 bits of data, one End-Of-Message (EOM) bit, and one acknowledge (ACK) bit transmitted by the receiver. A CEC message includes a series of CEC blocks wherein only the EOM bit of the last block in the message is on. Each CEC message starts with a block having 4 bits of source address (also referred to as nibble), 4 bits of destination address, an EOM bit, and an ACK bit. A polling message includes the same source and destination addresses with the EOM bit on.

CEC includes an option for customized commands. This enables different vendors to create CEC based networks between products of the specific vendor. Examples of such modified CEC base networks include: Anynet (Samsung), Aquos Link (Sharp), BRAVIA Theatre Sync (Sony), Regza Link (Toshiba), RIHD (Onkyo), Simplink (LG), Viera Link/EZ-Sync (Panasonic/JVC), Easylink (Philips) and NetCommand for HDMI (Mitsubishi).

BRIEF SUMMARY

In one embodiment, a method for assigning a required physical address to an HDMI-CEC device, including: determining by a manipulating switch the required HDMI physical address to be assigned to an upstream HDMI-CEC device, and providing the required HDMI physical address to the upstream HDMI-CEC device, wherein the required HDMI physical address is different from the true HDMI physical address that should have been assigned according to the standard HDMI procedure for computing an HDMI physical address.

In one embodiment, a method for operating a network including at least two HDMI-CEC display devices with their associated at least two HDMI-CEC cluster trees that at least partially overlap, including: identifying a set of HDMI physical addresses to be assigned to the HDMI-CEC devices in at least one upstream HDMI-CEC sub cluster tree of a manipulating switch, whereby these HDMI physical addresses will be consistent in the HDMI-CEC network views of the first and the second HDMI-CEC display devices.

In one embodiment, a method for operating a network including at least two HDMI-CEC display devices with their associated at least two HDMI-CEC cluster trees that at least partially overlap, including: identifying a set of CEC logical addresses to be assigned to at least some of the HDMI-CEC devices in the upstream HDMI-CEC sub cluster trees of a manipulating switch, whereby the CEC logical addresses will be consistent in the HDMI-CEC network views of the first and the second HDMI-CEC display devices.

In one embodiment, a method for assigning a required CEC logical address to an HDMI-CEC source device, including: determining the required CEC logical address to be acquired by the HDMI-CEC source device; reinitializing the HDMI-CEC source device to acquire a CEC logical address utilizing polling messages; and spoofing the acknowledgements to polling messages containing CEC logical addresses other than the required CEC logical address.

In one embodiment, a method including: dividing, by a manipulating switch, a plurality of HDMI-CEC devices into at least a first HDMI-CEC cluster tree coupled to a first HDMI-CEC display device, and a second HDMI-CEC cluster tree coupled to a second HDMI-CEC display device, wherein the HDMI-CEC cluster trees partially overlap; determining a first and a second HDMI-CEC network view for the first and the second HDMI-CEC display devices, whereby the two HDMI-CEC network views partially overlap; enabling a second HDMI-CEC source device in the second HDMI-CEC cluster tree to acquire a required CEC logical address already in use by a first HDMI-CEC source device in the first HDMI-CEC cluster tree, wherein the first and the second HDMI-CEC source devices are located in the non-overlapping parts of the HDMI-CEC network views.

Implementations of the disclosed embodiments involve performing or completing selected tasks or steps manually, semi-automatically, fully automatically, and/or a combination thereof. Moreover, depending upon actual instrumentation and/or equipment used for implementing the disclosed embodiments, several embodiments could be achieved by hardware, by software, by firmware, or a combination thereof. In particular, with hardware, embodiments of the invention could exist by variations in the physical structure. Additionally, or alternatively, with software, selected functions of the invention could be performed by a data processor, such as a computing platform, executing a software instructions or protocols using any suitable computer operating system.

BRIEF DESCRIPTION OF THE DRAWINGS

The embodiments of the present invention are herein described, by way of example only, with reference to the accompanying drawings. No attempt is made to show structural details of the embodiments in more detail than is necessary for a fundamental understanding of the embodiments. In the drawings.

The embodiments of the present invention are herein described, by way of example only, with reference to the accompanying drawings. No attempt is made to show structural details of the embodiments in more detail than necessary for a fundamental understanding of the embodiments. In the drawings.

DETAILED DESCRIPTION

Figure 1A:
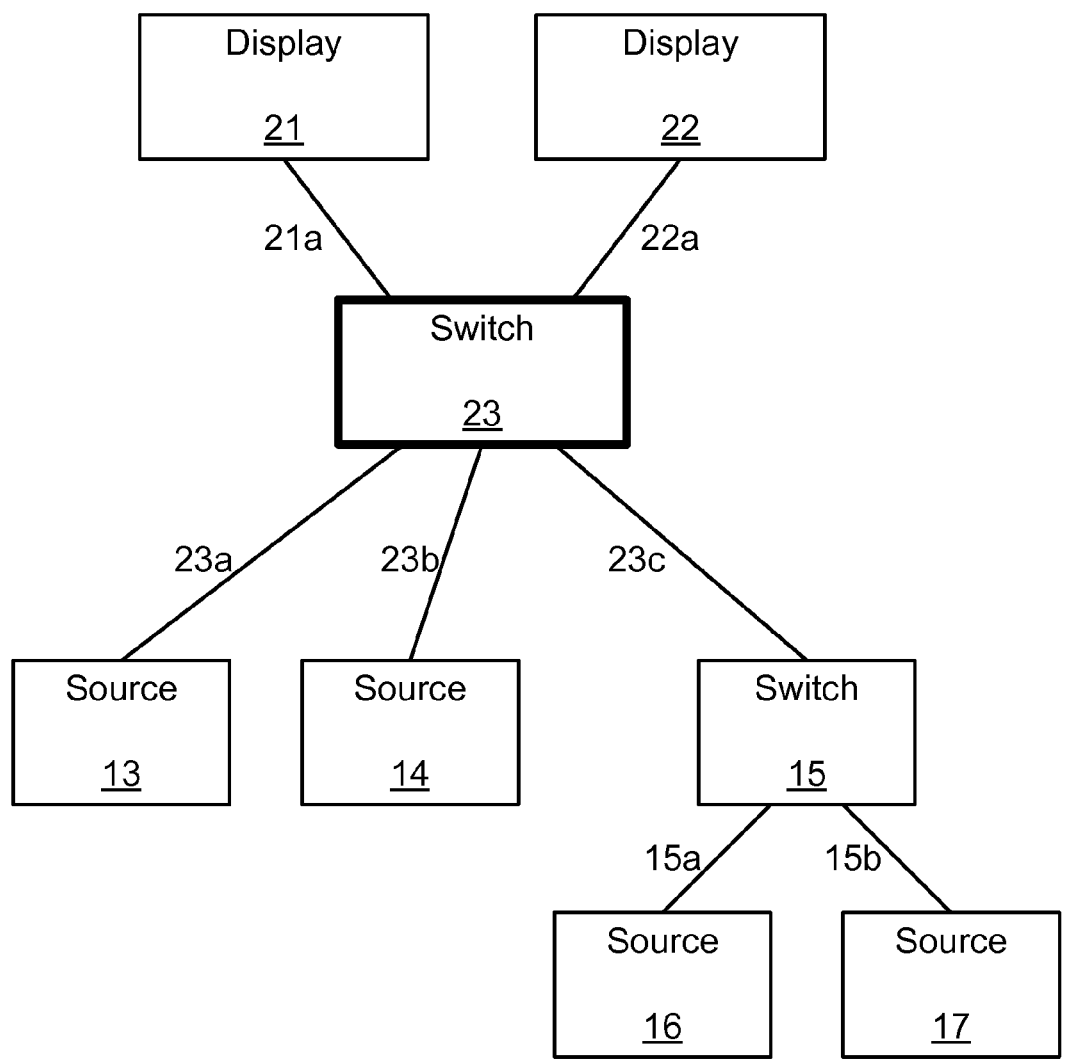
FIG. 1A illustrates a multi display network in accordance with one embodiment of the invention.

In the following description, numerous specific details are set forth. However, the embodiments of the invention may be practiced without these specific details. In other instances, well-known hardware, software, materials, structures and techniques have not been shown in detail in order not to obscure the understanding of this description. In this description, references to "one embodiment" or "an embodiment" mean that the feature being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some flow diagrams operations are described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed.

In the following description, numerous specific details are set forth. However, the embodiments of the invention may be practiced without these specific details. In other instances, well-known hardware, software, materials, structures and techniques have not been shown in detail in order not to obscure the understanding of this description. In this description, references to "one embodiment" or "an embodiment" mean that the feature being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some operations in the flow diagrams may be described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed.

DVI™ (Digital Visual Interface) is a video interface standard designed by the Digital Display Working Group consortium. HDMI™ (High-Definition Multimedia Interface) is a digital interface for audio and video signals designed by the HDMI consortium. DisplayPort™ is a digital display interface standard put forth by the Video Electronics Standards Association (VESA)™.

Conventional CEC networks assume a network topology including only one display device. A display device may be any kind of video display, television, or projector. Some of the following embodiments discuss the operation of novel methods and systems for utilizing HDMI-CEC in a network including more than one display device and novel methods and systems for multi-display networks supporting HDMI-CEC. The embodiments may operate with standard HDMI-CEC devices and/or with partially compatible devices.

An HDMI-CEC input port is associated with an "HDMI-CEC cluster tree" which includes all the upstream devices having HDMI physical paths to that HDMI-CEC input port. Herein, the upstream direction is from a sink device to a source device, and the downstream direction is from a source device to a sink device.

The term "HDMI-CEC network view" includes the network topology and the linkage between HDMI physical addresses and CEC logical addresses as exposed to a device through the CEC <report physical address> messages that it receives. It is to be understood that the "HDMI-CEC cluster tree" represents the actual physical topology while the "HDMI-CEC network view" may be manipulated, for example, by a manipulating switch as described below. The HDMI-CEC network view of device 'X' enables device 'X' to communicate with the various devices available in its HDMI-CEC network view.

Figure 3:
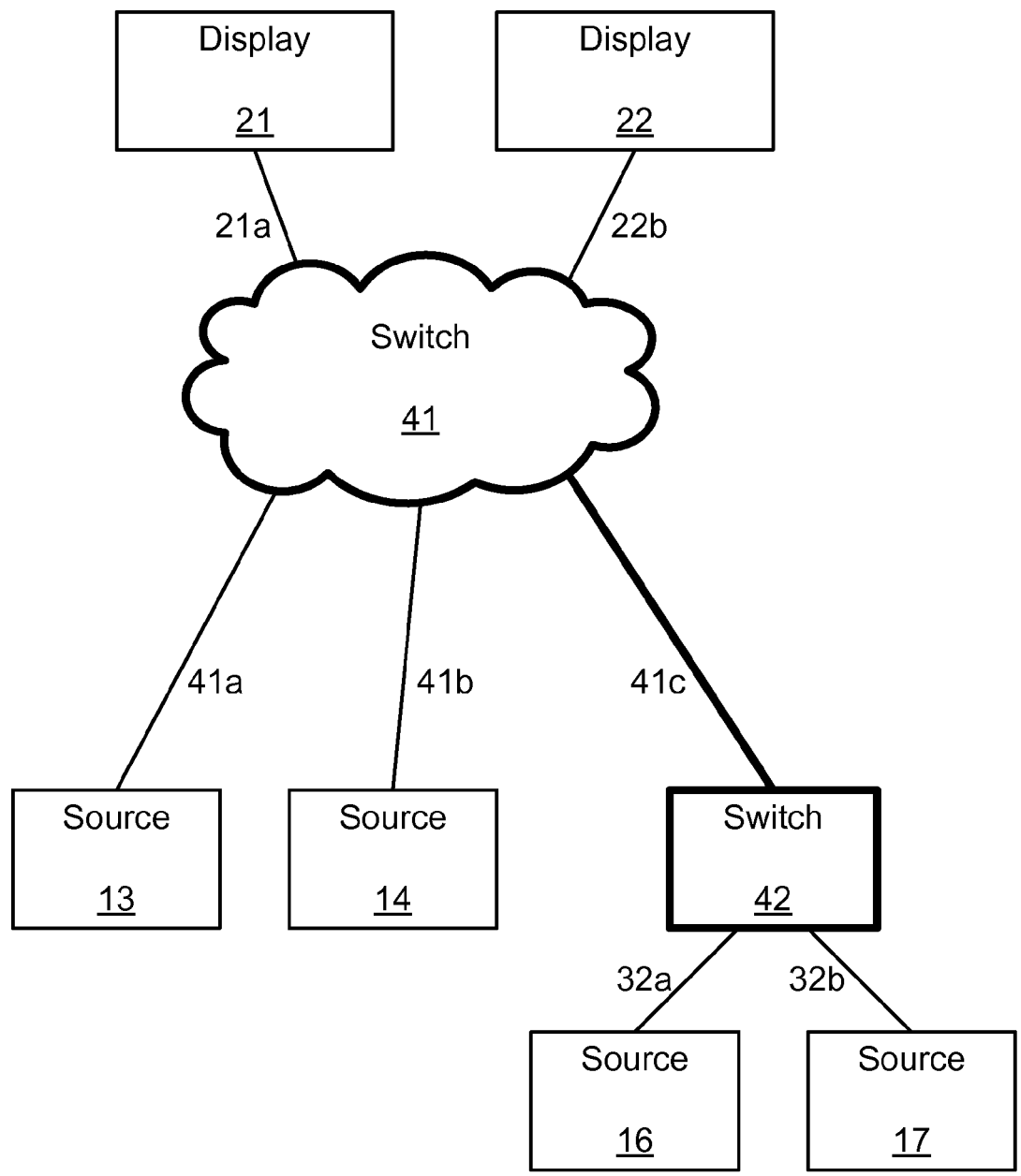
FIG. 3 illustrates a multi stream network in accordance with one embodiment of the invention.

In some of the embodiments, "manipulating switch" denotes a component comprising at least one input port supporting HDMI-CEC and at least two output ports supporting HDMI-CEC transactions. A manipulating switch may also be any component comprising at least one input and at least two outputs which capable of delivering HDMI-CEC data. A manipulating switch may utilize any physical transmission that can be converted to HDMI-CEC. Optionally, the manipulating switch may be located within or integrated with one of the HDMI-CEC source devices. Optionally, the manipulating switch may be located within or integrated with one of the HDMI-CEC display devices. The manipulating switch may be implemented as a single component. Alternatively, the manipulating switch may be implemented as two or more interconnected components, optionally forming a cluster and/or network, whereby the described functionality of the manipulating switch may refer to the functionality accomplished by a part or the whole of the cluster and/or network. FIG. 3 illustrates a manipulating switch 41 representing two or more components forming the manipulating switch functionality together.

It is to be understood that "HDMI-CEC cluster tree" may refer to an entire network or refer just to a sub-network. Referring to FIG. 1A as an example, in one case, source devices 13-17 form a first HDMI-CEC cluster tree coupled to display device 21, and the same source devices 13-17 form a second HDMI-CEC cluster tree coupled to display device 22. In another example, display device 21 and source devices 13-17 form a first HDMI-CEC cluster tree, and display device 22 and source devices 13-17 form a second HDMI-CEC cluster tree. The manipulating switch 23 may or may not be regarded as included in one or more of the HDMI-CEC cluster trees.

Multiple Display Network Supporting HDMI-CEC

In prior art HDMI-CEC devices every CEC message is received by all devices connected to the HDMI-CEC cluster tree and only one output port may be connected to the HDMI-CEC cluster tree.

FIG. 1A illustrates one embodiment of a manipulating switch 23 that includes logic that enables a plurality of HDMI-CEC display devices (21, 22) to control an HDMI-CEC cluster tree, comprised of standard HDMI-CEC sources (13, 14, 16, 17) and standard HDMI-CEC switch 15.

The manipulating switch 23 dynamically manipulates the HDMI-CEC network views, such that when none of the source devices is active, each display device may control all source devices. And when a first display device communicates with a first source device using HDMI-CEC, the second display device can still communicate with the other source device using HDMI-CEC. For example, when none of the source devices is active, display device 21 may control, through its CEC bus, source devices 13, 14, 16, and 17 and switches 23 and 15. Display device 22 may also control, through its CEC bus, the same source devices 13, 14, 16, and 17 and switches 23 and 15. When display device 21 activates source device 16, the manipulating switch 23 manipulates the HDMI-CEC network view of display device 22 to reflect only source devices 13 and 14. Source device 17 is also erased from the HDMI-CEC network view of display device 22 because it is connected though HDMI link 23c which is already used by source device 16.

Figure 12:
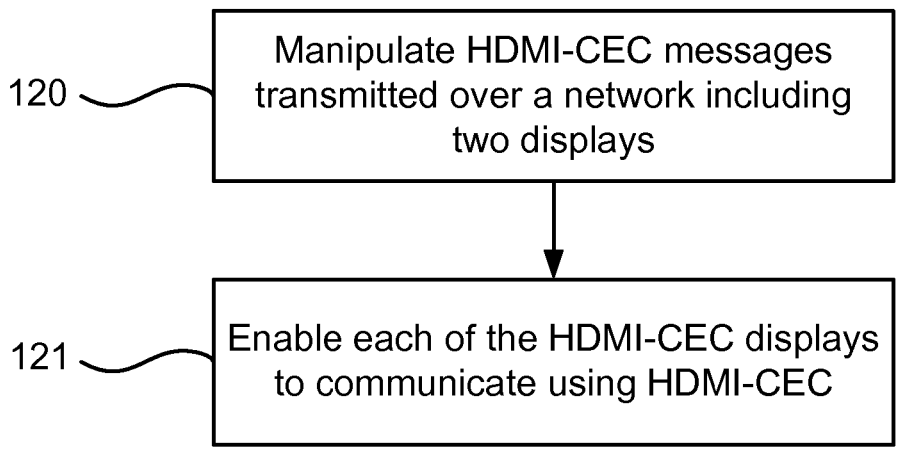
FIG. 12 is a flow diagram of one method in accordance with one embodiment of the invention.

FIG. 12 is a flow diagram illustrating one method comprising the following steps: In step 120, manipulating HDMI-CEC messages transmitted over a network comprising at least two HDMI-CEC display devices with their associated at least two HDMI-CEC cluster trees that at least partially overlap. And in step 121, enabling each of the HDMI-CEC display devices to communicate using HDMI-CEC with its associated HDMI-CEC cluster tree according to its current HDMI-CEC network view.

Figure 1B:
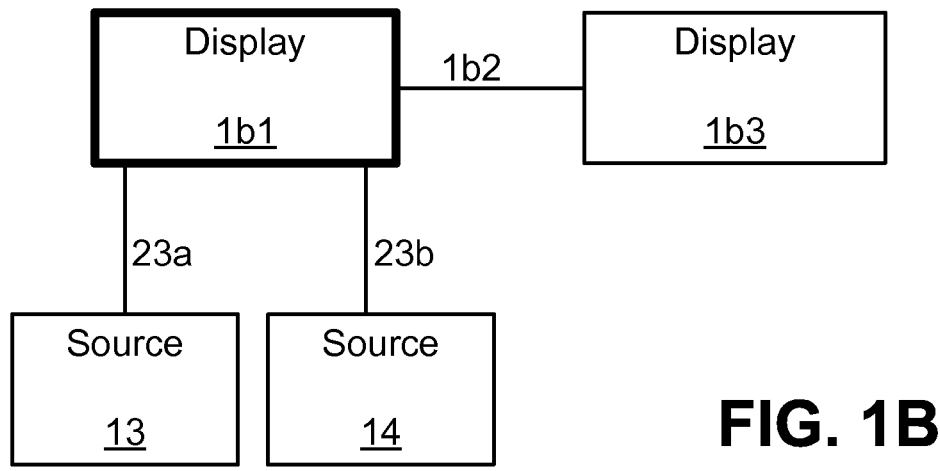
FIG. 1B illustrates a multi port display device in accordance with one embodiment of the invention.
Figure 1C:
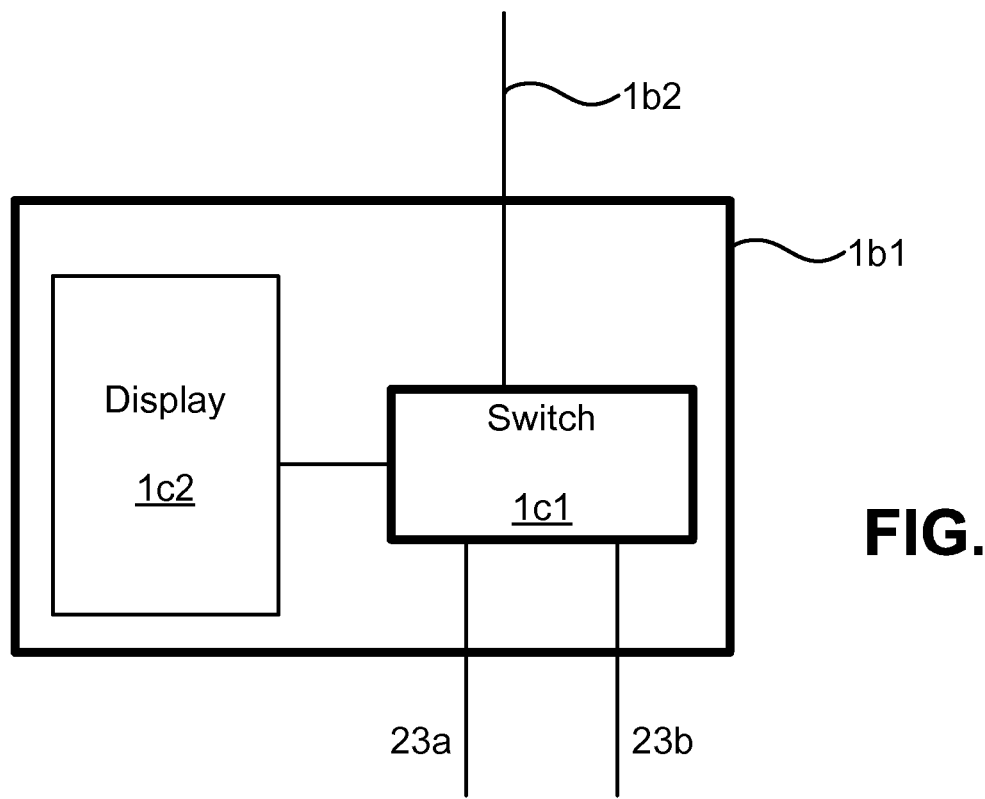
FIG. 1C illustrates a manipulating switch inside a display device in accordance with one embodiment of the invention.

FIGS. 1B-1C illustrate one embodiment wherein the manipulating switch 1c1 is located within the display device 1b1. The manipulating switch 1c1 includes logic that enables a plurality of HDMI-CEC display devices (1b1, 1b3) to control an HDMI-CEC cluster tree, comprised of standard HDMI-CEC sources (13, 14). The embodiment illustrated by FIG. 1B enables a user to chain two or more display devices such that when none of the source devices is active, each display device may control all source devices, and when a first display device communicates with a first source device using HDMI-CEC, the second display device can still communicate with the second source device using HDMI-CEC.

Figure 2:
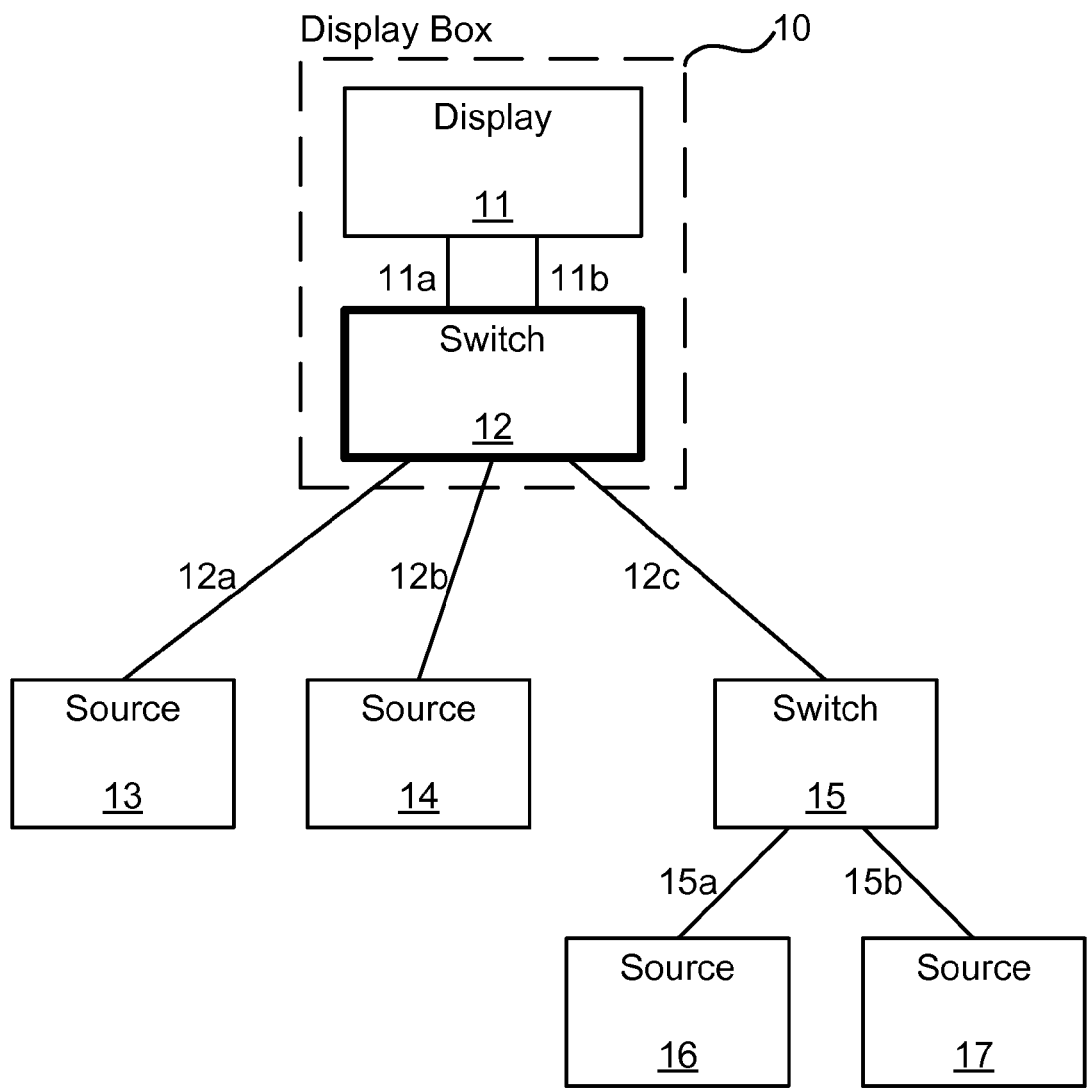
FIG. 2 illustrates a multi port display device in accordance with one embodiment of the invention.

FIG. 2 illustrates one embodiment of a display device with a manipulating switch 12 that includes logic for controlling overlapping or partially overlapping HDMI-CEC networks. By using the manipulating switch 12, and assuming that the CEC buses of 11a and 11b are not physically connected, both HDMI-CEC ports (11a, 11b) may control the HDMI-CEC sources (13, 14, 16, 17). The HDMI-CEC ports (11a, 11b) may be coupled to a standard HDMI-CEC display device 11 as illustrated. In the specific non-limiting example of FIG. 2, the manipulating switch 12 resides within a display box 10

(such as a television, a monitor or a projector), but it is to be understood that the manipulating switch 12 may reside within any other display device, source device, or as a stand-alone device. The manipulating switch 12 selects and manipulates the data to be transmitted over the different HDMI-CEC networks connected to HDMI-CEC ports 11a and 11b.

Figure 13:
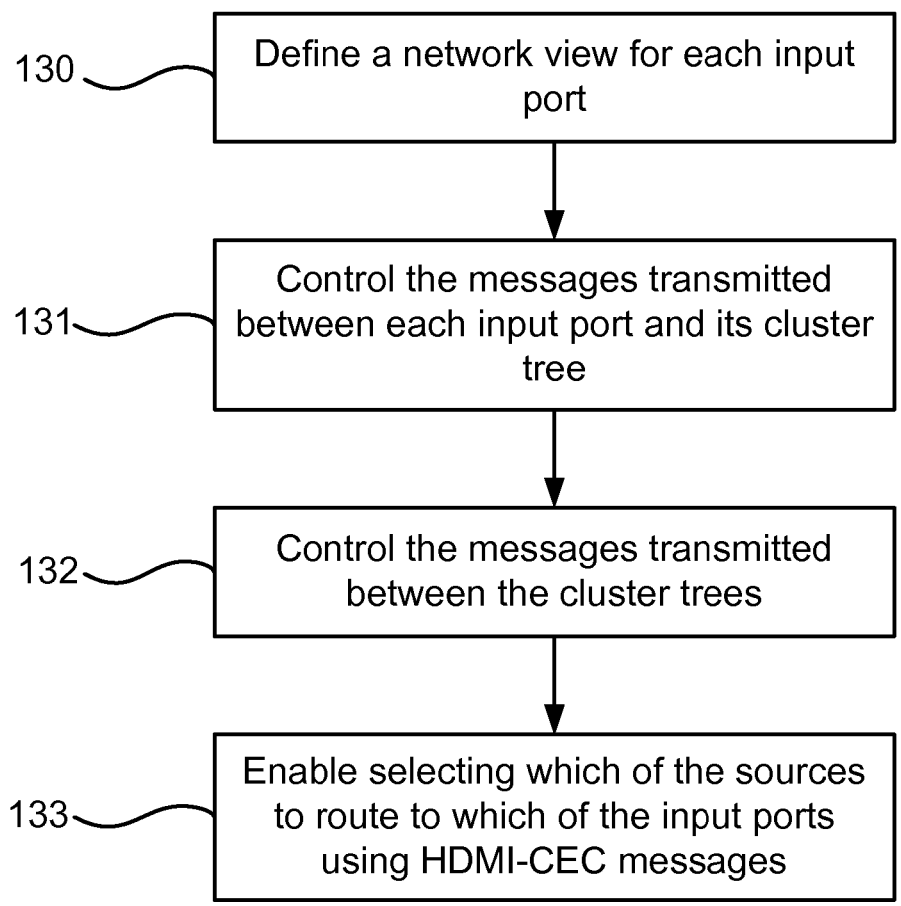
FIG. 13 is a flow diagram of a routing method in accordance with one embodiment of the invention.

FIG. 13 is a flow diagram illustrating one method for enabling picture-in-picture in a display device comprising two HDMI-CEC input ports, each of the HDMI-CEC input ports associated with an HDMI-CEC cluster tree, and the HDMI-CEC cluster trees at least partially overlapping, the method comprising the following steps: In step 130, defining an HDMI-CEC network view for each HDMI-CEC input port. In step 131, controlling the HDMI-CEC messages transmitted between each HDMI-CEC input port of the HDMI-CEC display device and its HDMI-CEC cluster tree. In step 132, controlling the HDMI-CEC messages transmitted between the HDMI-CEC cluster trees. And in step 133, enabling selecting which of the HDMI-CEC source devices to route to which of the HDMI-CEC input ports using HDMI-CEC messages.

Referring again to FIG. 2, the manipulating switch 12 includes logic that enables it to communicate with source devices 13 and 14, and with source devices 16 and 17 through switch 15, using HDMI-CEC, and still output one or more pictures through ports 11a and 11b. This capability enables the display device 11 to have, for example, a picture-in-picture feature, while it is possible to control each picture's source through the HDMI-CEC network view. It may also be possible to operate all the sources (13, 14, 16, 17), using the display's remote control, through standard HDMI-CEC, while having the picture-in-picture feature.

In one embodiment, the physical addresses, and optionally the logical addresses, of the HDMI-CEC network are approximately duplicated by the manipulating switch 12, such that the display device 11 is able to control sources (13, 14, 16, and 17) either through HDMI-CEC port 11a or through HDMI-CEC port 11b.

In one embodiment, the manipulating switch 12 transmits some data between the two HDMI-CEC networks. It is possible to control what data will be transferred between the HDMI-CEC cluster trees and when.

Operating the Video Network

Prior art HDMI-CEC networks having one display device enable the user to: (i) operate the HDMI-CEC cluster tree using a display device, optionally utilizing the set-stream-path message, and (ii) operate the HDMI-CEC cluster tree using a source device, optionally utilizing the one touch play feature.

In one embodiment, at least one source device is connected through at least one manipulating switch to at least two display devices, and a user operates the HDMI-CEC network through a display device utilizing the set-stream-path message. The display device is able to operate the required source device using the standard set-stream-path message because the manipulating switch makes each display device believe it is connected to a standard HDMI-CEC network having one display device.

In one embodiment, at least one source device is connected through at least one manipulating switch to at least two display devices, and a user operates the HDMI-CEC network through a source device utilizing the one touch play feature. In this embodiment, when a source device activates a display device, for example, by utilizing the 'one-touch play' CEC feature, for example as described in HDMI spec 1.3 paragraph "CEC 13.1 One Touch Play", the manipulating switch should select which of the available display devices to connect with the source device. The logic for selecting the display device to be connected to the source device may be pre-defined, dynamically selected, and/or manually selected.

For example, the display device on which the content is to be displayed may be selected according to one of the following non-limiting examples: displaying the content on a display device that is defined as the primary display device; displaying the content on a display device that is already active; or displaying the content on a display device that is not active.

Referring again to FIG. 1A as an example, if source 16 is operating a 'one-touch play' while display device 21 plays content from source device 13, manipulating switch 23 may connect source device 16, instead of source device 13, to display device 21; or connect source device 16 to display device 22; or display a menu on display device 21 and/or on display device 22 in order to enable the user to select the desired display device; or connect source device 16 to the display device it was last connected to; or operate according to any other reasonable logic.

In one embodiment, when the user tries to operate the HDMI-CEC cluster tree from the source device, optionally using the one touch play feature, the manipulating switch takes over and the HDMI-CEC cluster tree is operated from the switch as discussed in the next paragraphs. In other words, operation from a source device may cause operation from the manipulating switch.

In one embodiment, at least one source device is connected through at least one manipulating switch to at least two display devices, and a user operates the network, which supports HDMI-CEC, through a manipulating switch that performs one or more of the following operations: (i) communicating with the various HDMI devices using the HDMI-CEC protocol, including spoofing when needed and as explained below, (ii) creating a control menu, which includes the display devices, and (iii) sending the control menu to at least one of the display devices for displaying.

Optionally, the user operates the control menu, created by the manipulating switch, through the remote control of the manipulating switch. Alternatively, the user operates the control menu, created by the manipulating switch, through any other appropriate means such as a multifunctional remote control communicating with the manipulating switch, or though the remote control of one of the display devices, wherein the display device forwards the user's selections to the manipulating switch. The display device may forward the user's selections to the manipulating switch directly or following a manipulation by the manipulating switch. One example of such a manipulation is when the manipulating switch emulates a source device that displays its menu on the display device using CEC available mechanisms for displaying menu and retrieves remote control actions. Examples of such CEC mechanisms are described in HDMI specification 1.3 paragraph "CEC 13.12 Device Menu Control" and include messages such as <User Control Pressed>, <User Control Released>, <Menu Request>, or <Menu Status>.

In one embodiment, in order to operate the HDMI-CEC cluster tree through the manipulating switch, the manipulating switch supplies the user with the devices available in the manipulated HDMI-CEC cluster tree (i.e. not bounded by the standard CEC rules).

Figure 15:
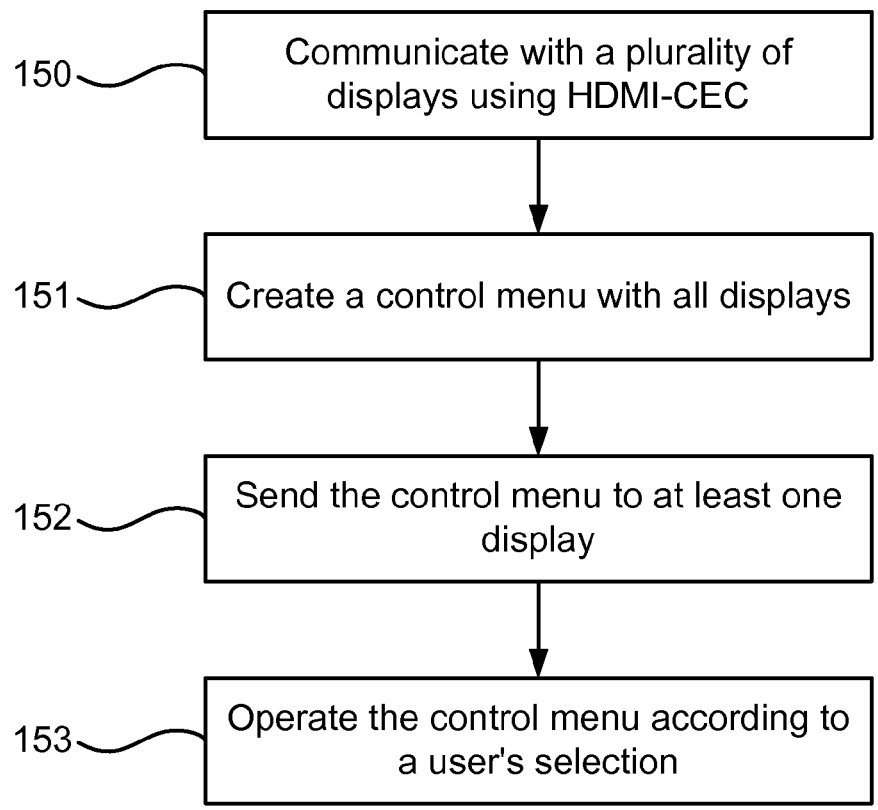
FIG. 15 is a flow diagram of a menu creation method in accordance with one embodiment of the invention.

FIG. 15 is a flow diagram illustrating one method for operating a network comprising at least two HDMI-CEC display devices with their associated at least two HDMI-CEC cluster trees that at least partially overlap, comprising the following steps: In step 150, communicating with the various HDMI- CEC cluster trees using HDMI-CEC. In step 151, creating a control menu which comprises the HDMI-CEC display devices. In step 152, sending the control menu to at least one of the HDMI-CEC display devices for display. And in step 153, operating the control menu according to a user's selection.

Figure 16:
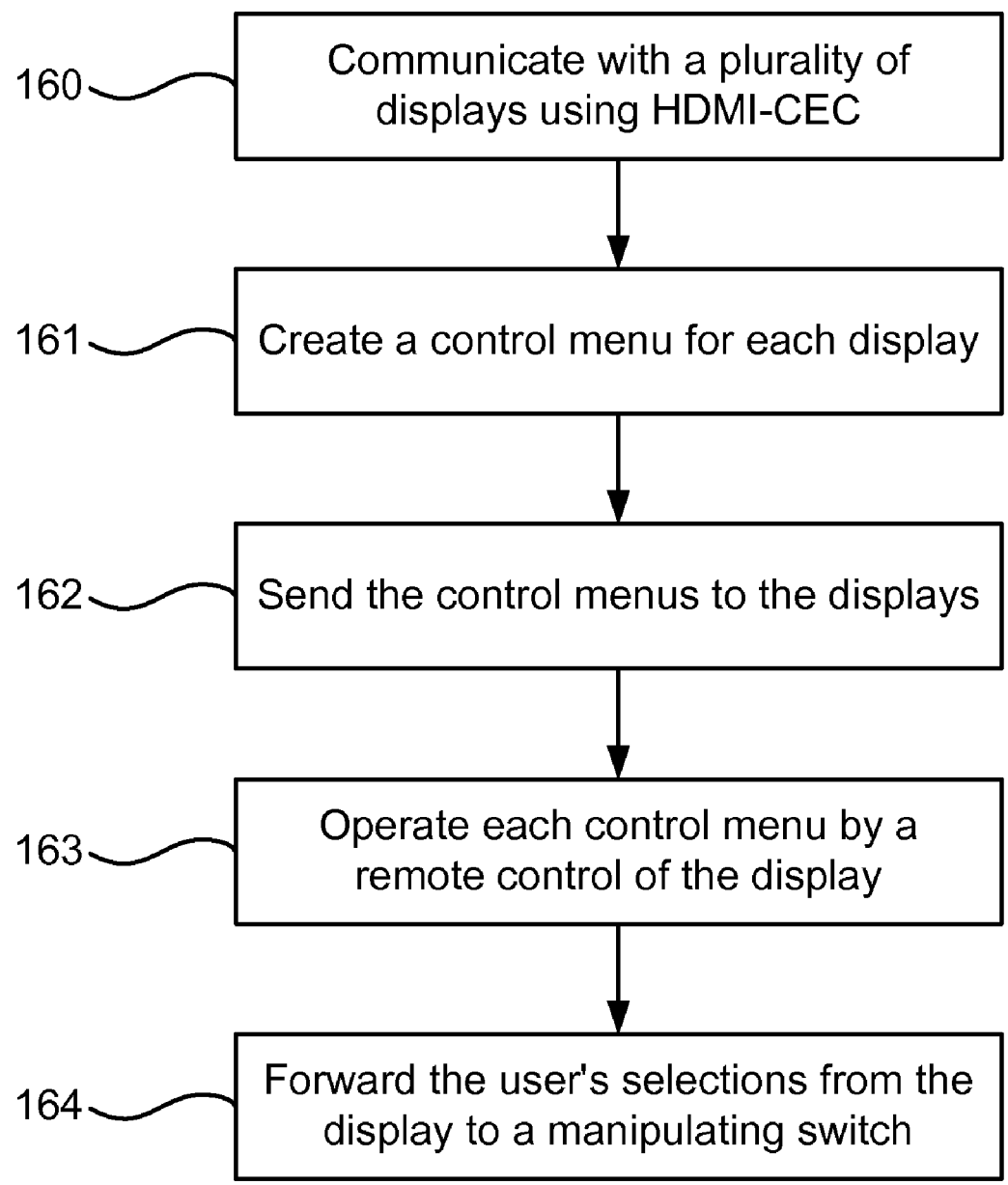
FIG. 16 is a flow diagram of a menu creation method in accordance with one embodiment of the invention.

FIG. 16 is a flow diagram illustrating one method for operating a network comprising at least two HDMI-CEC display devices with their associated at least two HDMI-CEC cluster trees that at least partially overlap, comprising: In step 160, communicating with the various HDMI-CEC cluster trees using HDMI-CEC. In step 161, creating a control menu for each of the HDMI-CEC display devices. In step 162, sending the control menus to the HDMI-CEC display devices for display. In optional step 163, operating each control menu by a remote control of the HDMI-CEC display device on which it is displayed. And in optional step 164, forwarding the user's selections from the HDMI-CEC display device to a manipulating switch.

Multi-Stream Channel Supporting CEC

Utilizing a Multi-Stream Channel Within an HDMI-CEC cluster tree.

Standard HDMI interface supports only one stream. A channel that is capable of transferring more than one HDMI stream is referred to herein as a multi-stream channel supporting HDMI-CEC. In some embodiments, the multi-stream channel supporting HDMI-CEC may be coupled to two or more HDMI output ports and therefore is somehow similar to a device having multiple HDMI inputs and multiple HDMI outputs.

A multi-stream manipulating switch refers to a switch that supports at least one multi stream channel. In one embodiment, the multi-stream manipulating switch is capable of manipulating at least some of the HDMI and CEC control transactions. A source device supporting a multi-stream daisy chain is referred to herein as a source device supporting multi-stream.

In one embodiment, one or more multi-stream channel supporting HDMI-CEC are embedded within an HDMI-CEC network, or within a network that is compatible or partially compatible with HDMI-CEC. As a result of using the multi-stream channel, it is possible to operate more than one source device connected to the HDMI-CEC cluster tree spanned by the multi-stream channel. Moreover, the system has to manipulate the HDMI-CEC cluster trees connected to the different display devices in order to be able to operate the source devices using CEC messages.

FIG. 3 illustrates one embodiment of a multi-display network supporting HDMI-CEC with a multi-stream channel 41c. The display devices (21, 22) are connected to multi-stream manipulating switch 41 that is connected to multi-stream manipulating switch 42 through a multi-stream channel supporting HDMI-CEC 41c. In the illustrated embodiment, manipulating switch 41 is implemented as two or more interconnected components, optionally forming a cluster and/or network, whereby the described functionality of the manipulating switch 41 may refer to the functionality accomplished by a part or the whole of the cluster and/or network. In one embodiment, after source device 16 starts transmitting to display device 21, display device 22 may only access devices 13, 14, and 17. But the available bandwidth of the multi-stream channel supporting HDMI-CEC 41c decreases and therefore the multi-stream manipulating switch 41 has to make sure that future transmissions from source device 17 will be limited to the available bandwidth of 41c. The throughput from source device 17 may be limited, for example, by implementing the following method:

Multi-stream manipulating switch 42 removes the HPD signal to source device 17;

Then source device 17 initiates a read EDID transaction;

Multi-stream manipulating switch 42 replies the read EDID transaction with a prefetched, manipulated, EDID of display device 22, such that only video formats that match the available bandwidth of the multi-stream channel 41c are exposed to source device 17.

Figure 4:
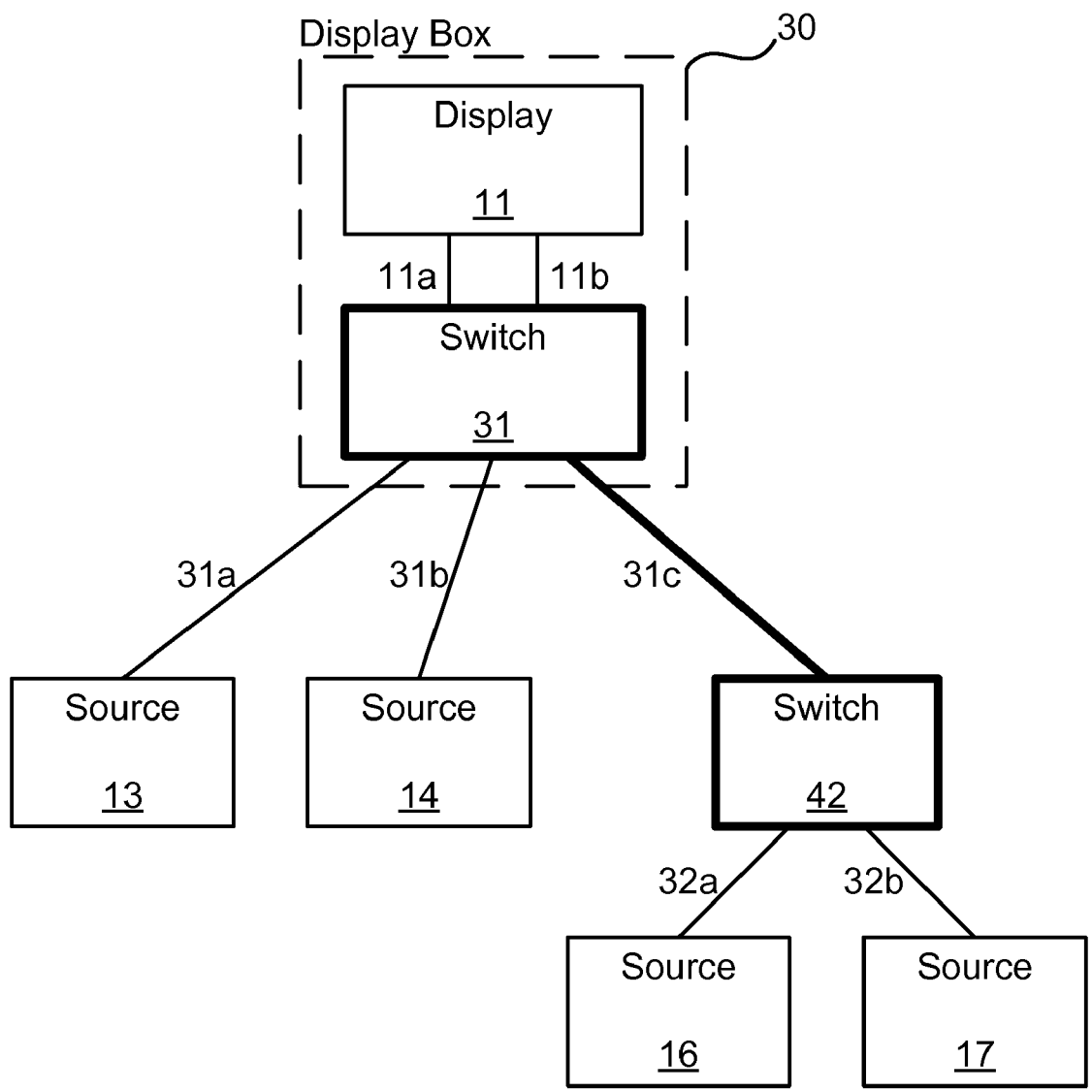
FIG. 4 illustrates a multi stream network in accordance with one embodiment of the invention.

FIG. 4 illustrates an embodiment where display box 30 includes a multi-stream manipulating switch 31 outputting two standard HDMI output signals through ports 11a and 11b to the display device 11. Multi-stream manipulating switch 31 communicates with multi-stream manipulating switch 42 through a multi-stream channel supporting HDMI-CEC 31c. Multi-stream manipulating switch 42 communicates with the source devices (16, 17) through standard HDMI-CEC interface (32a, 32b). When none of the source devices is active, and assuming that the CEC buses of ports 11a and 11b are not physically connected, the source devices (13, 14, 16, 17) are visible to the display device 11 in one or two HDMI-CEC network views (because display device 11 has only two HDMI-CEC inputs, 11a and 11b, it cannot have more than two HDMI-CEC network views).

After source device 16 is activated through port 11a, and because channel 31c is a multi-stream channel supporting HDMI-CEC, it is still possible to communicate with source device 17 through port 11b. Therefore, multi-stream manipulating switch 31 manipulates the HDMI-CEC network view such that source devices 13, 14, and 17 appear to be in the HDMI-CEC network view of port 11b, and therefore HDMI-CEC display device 11 is still able to communicate with one of the remaining source devices (13, 14, and 17).

When initializing the two HDMI-CEC network views of ports 11a and 11b, multi-stream manipulating switch 31 may place the source devices 16 and 17 under the same HDMI-CEC network view or under different HDMI-CEC network views. Optionally, when channel 31c is a multi-stream channel supporting HDMI-CEC, the multi-stream manipulating switch 31 may manipulate the HDMI-CEC network views as needed and locate source devices 16 and 17 to be in the HDMI-CEC network view of port 11a or in the HDMI-CEC network view of port 11b.

In one embodiment, after source device 16 starts transmitting to port 11a, source device 17 is manipulated by multi-stream manipulating switch 31 to be in the HDMI-CEC network view of port 11b. But the available bandwidth of the multi-stream channel supporting HDMI-CEC 31c decreases and therefore the multi-stream manipulating switch 31 has to make sure that future transmissions from source device 17 will be limited to the available bandwidth of the multi-stream channel supporting HDMI-CEC 31c. The throughput from source device 17 may be limited, for example, by implementing the following method:

Multi-stream manipulating switch 42 removes and restores the HPD signal to source device 17, in order to cause source 17 to read the EDID;

Then source device 17 initiates a read EDID transaction; and then

Multi-stream manipulating switch 42 replies the read EDID transaction with a prefetched, manipulated, EDID of display device 11 such that only video formats that match the available bandwidth of the multi-stream channel supporting HDMI-CEC 31c are exposed to source device 17. For example, assuming link 31c is a multi-stream channel supporting HDMI-CEC that is capable of transporting a total throughput of 8 Gbps, which is suitable for transmitting 1080 p, 60 Hz, 48 bit per pixel (bpp); If source device 16 transmits 1080 p 60 Hz 24 bpp to port 11a, the multi-stream channel supporting HDMI-CEC 31c still has enough bandwidth to transmit another 1080 p 60 Hz 24 bpp stream. Assuming display device 11 EDID indicates it can support 1080 p 60 Hz 36 bpp, then if source device 17 tries to transmit this kind of video format, the multi-stream channel supporting HDMI-CEC 31c will not have enough capacity. Therefore, multi-stream manipulating switch 42 removes and restores the HPD signal to source device 17, so that source 17 reads the manipulated EDID of display device 11, such that no other formats requiring higher bandwidth than the available bandwidth seem to be supported by port 11b.

In another example, it is required to ensure in advance that there is enough bandwidth for a predefined number of source devices capable of transmitting over a multi-stream channel supporting HDMI-CEC. In this case, before the first source device starts transmitting, the EDID of the appropriate display device is manipulated such that the total maximum bandwidth consumed by the predefined number of the source devices communicating in parallel through the multi-stream channel supporting HDMI-CEC is supported by the multi-stream channel. For example, if 31c is a multi-stream channel supporting HDMI-CEC capable of transmitting a total throughput of 8 Gbps, each of source devices 16 and 17 will be supplied with formats having a throughput that is equal to or lower than 1080 p 60 Hz 24 bpp stream.

Multi-Stream Daisy Chain Supporting HDMI-CEC.

Figure 5A:
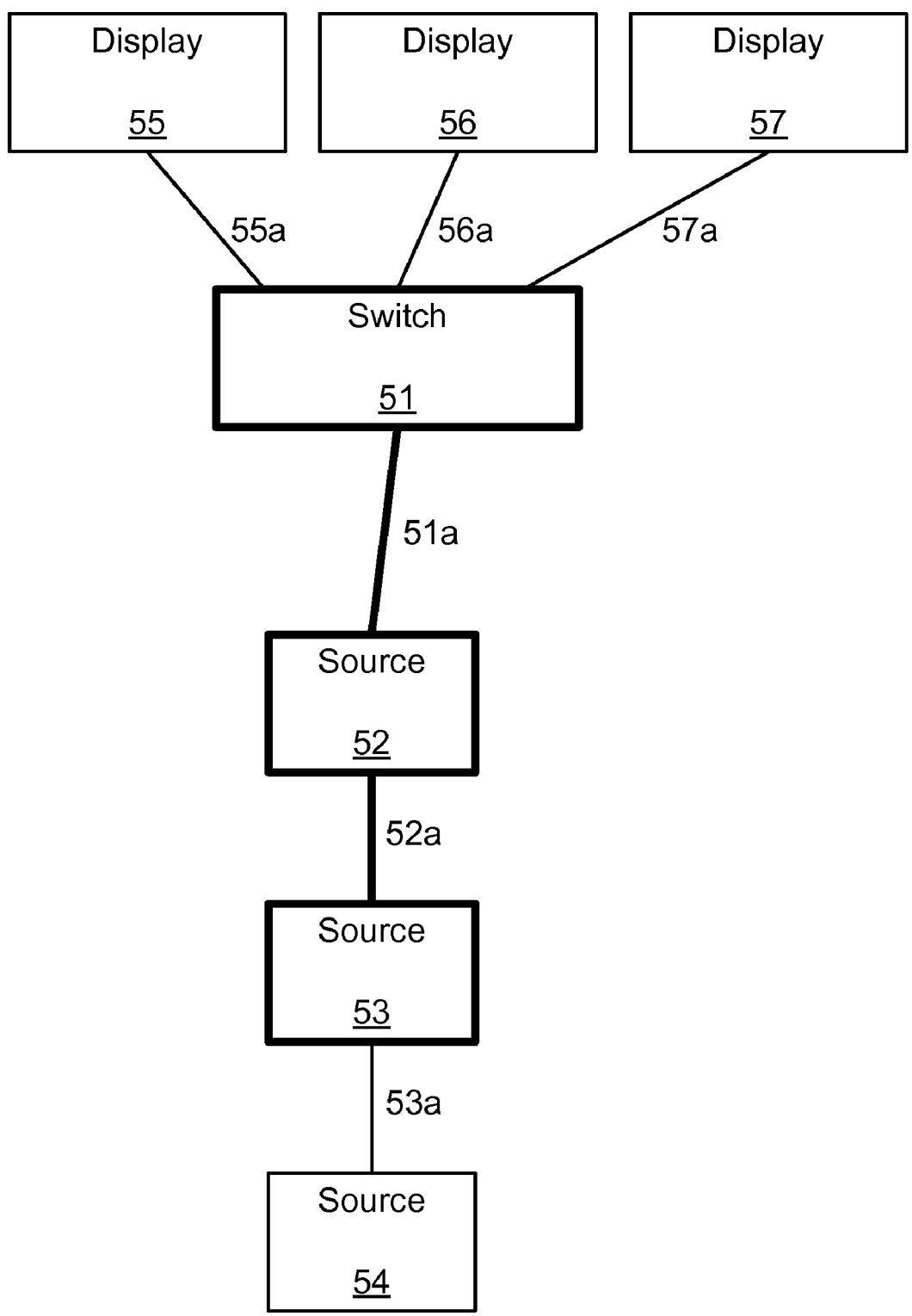
FIG. 5A illustrates a daisy chain in accordance with one embodiment of the invention.

FIG. 5A illustrates a multi-stream sub network within a multi-display network supporting HDMI-CEC having a multi-stream daisy chain including source devices supporting multi-stream 52, and 53, and source device 54, connected through the multi-stream channels supporting HDMI-CEC 51a and 52a to the multi-stream manipulating switch 51, that is connected to display devices 55, 56, and 57. In this embodiment, the multi-stream manipulating switch 51 and each of the source devices supporting multi-stream (52, 53) have to calculate their upstream residue bandwidth, and then expose only the video formats that match the available bandwidth of the chain's bottleneck.

For example, multi-stream channels supporting HDMI-CEC 51a and 52a have a maximum throughput of 8 Gbps each. Assuming display device 56 requests from source device supporting multi-stream 52 to start transmitting a 6 Gbps stream over the multi-stream channel supporting HDMI-CEC 51a, then the multi-stream channel supporting HDMI-CEC 51a has a residue bandwidth of 2 Gbps. Therefore, source device supporting multi-stream 52 transmits to source device supporting multi-stream 53 a message informing it that the residue bandwidth is 2 Gbps. In one embodiment, the multi-stream channel supporting HDMI-CEC includes an internal control channel between its nodes. Optionally, device 52 utilizes the internal control channel for transmitting to device 53 the message informing that the residue bandwidth is 2 Gbps. Thereafter, assuming display device 57 requests from source device 54 to start transmitting, then source device supporting multi-stream 53 removes and restores the HPD signal to source device 54, in order to make it read the EDID of a virtual display device supporting up to 2 Gbps.

Figure 5B:
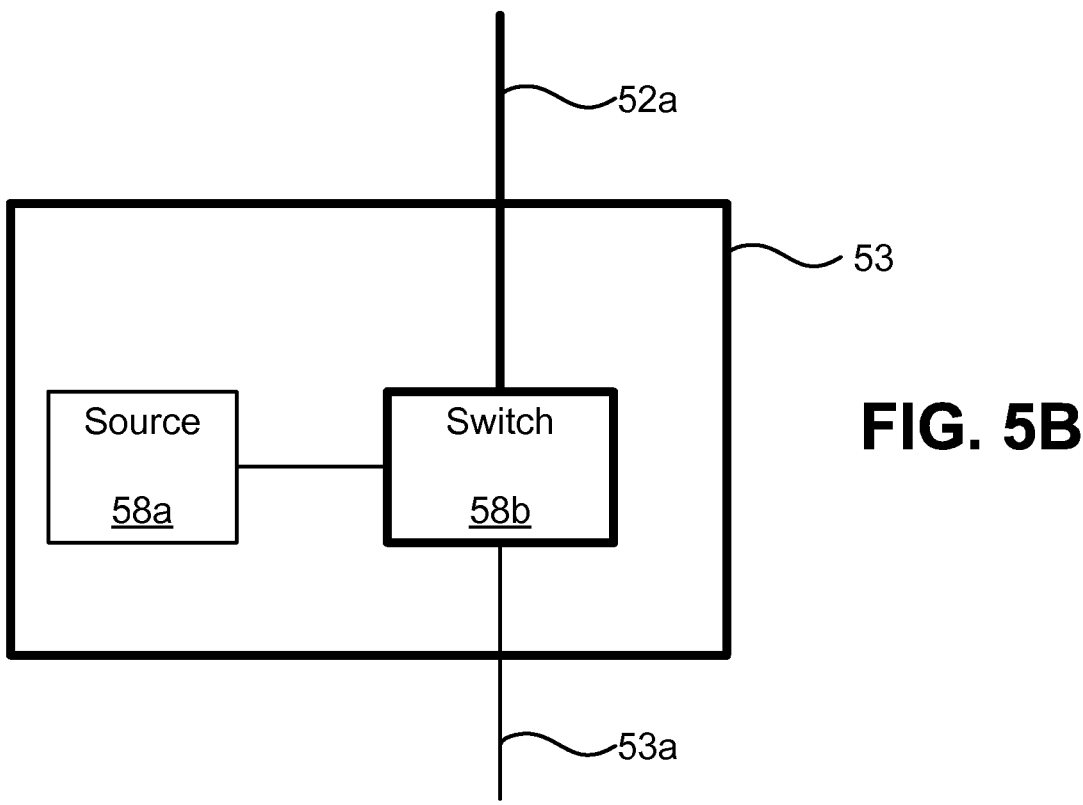
FIG. 5B illustrates a multi stream manipulating switch inside a source device in accordance with one embodiment of the invention.

FIG. 5B illustrates one embodiment of a source device supporting multi-stream 53, including: (i) an HDMI input port 53a, (ii) a data source 58a, and (iii) a multi-stream manipulating switch 58b having two HDMI inputs ports and one multi-stream channel supporting HDMI-CEC 52a output. Optionally, the source device supporting multi-stream 53 is capable of utilizing the multi-stream channel supporting HDMI-CEC 52a for data received from the data source 58a, or data received from the HDMI input port 53a, or for data received from both inputs.

Figure 5C:
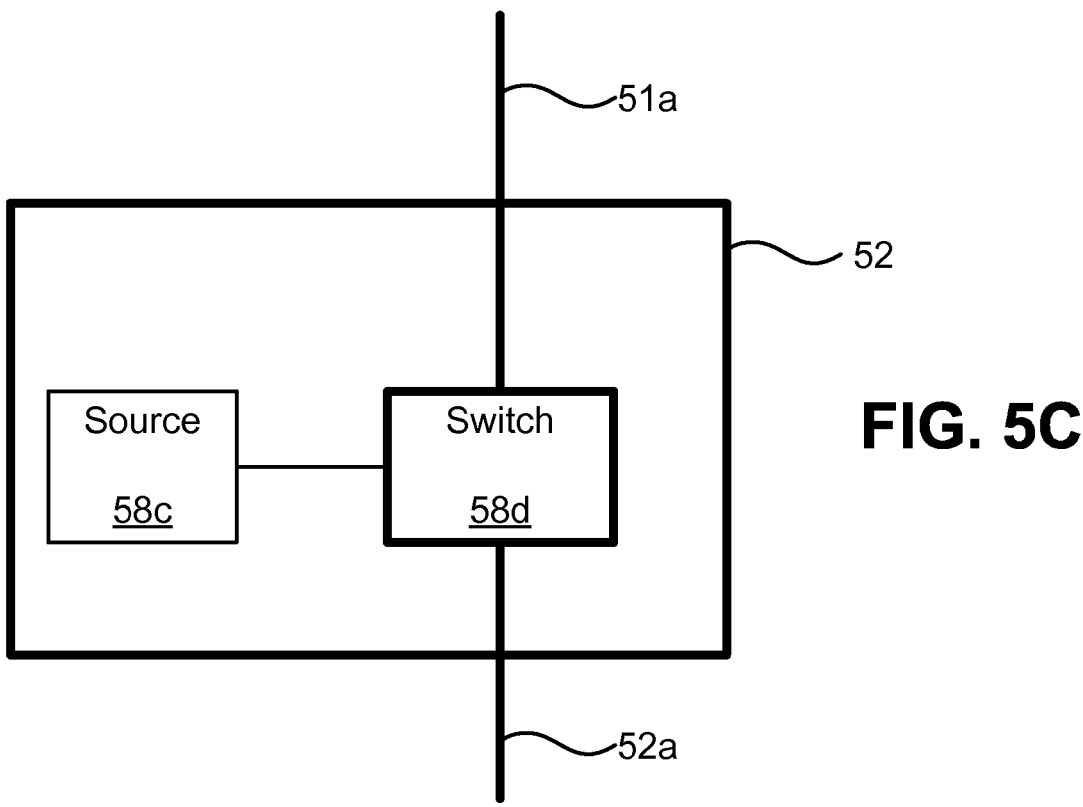
FIG. 5C illustrates a multi stream manipulating switch inside a source device in accordance with one embodiment of the invention.

FIG. 5C illustrates one embodiment of a source device supporting multi-stream 52, including: (i) an input for receiving a multi-stream channel supporting HDMI-CEC 52a, (ii) a data source 58c, and (iii) a multi-stream manipulating switch 58d having one HDMI stream input, one multi-stream channel supporting HDMI-CEC input, and one multi-stream channel supporting HDMI-CEC 51a output. Optionally, the source device supporting multi-stream 52 is capable of utilizing the multi-stream channel supporting HDMI-CEC 51a for data received from the data source 58c, or data received from the multi-stream channel supporting HDMI-CEC 52a, or for data received from both inputs.

Figure 5D:
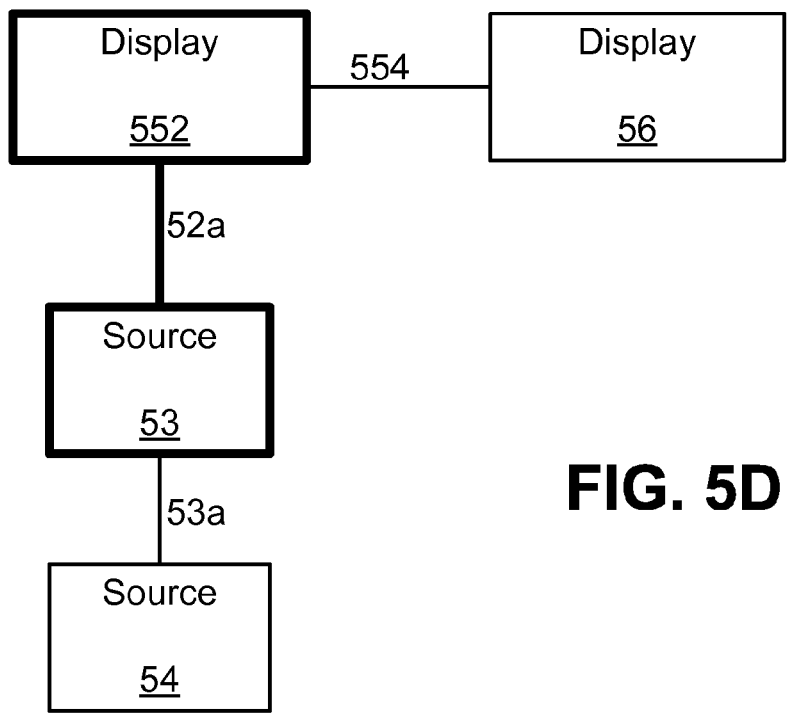
FIG. 5D illustrates a multi stream network in accordance with one embodiment of the invention.
Figure 5E:
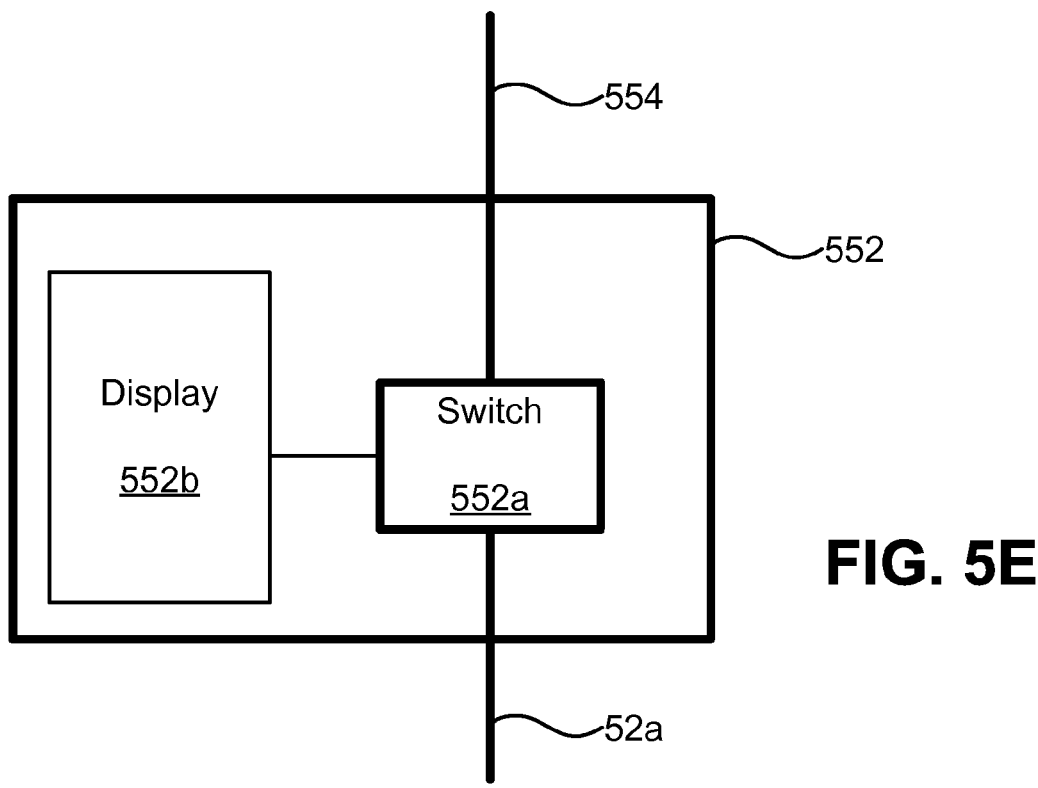
FIG. 5E illustrates a multi stream manipulating switch inside a source device in accordance with one embodiment of the invention.

FIGS. 5D-5E illustrate one embodiment wherein the multi-stream manipulating switch 552a is located within a display device 552. The multi-stream manipulating switch 552a includes logic which enables a plurality of HDMI-CEC display devices (552, 56) to control an HDMI-CEC cluster tree, comprising a standard HDMI-CEC source 54 and a source device supporting multi-stream 53. The embodiment illustrated by FIG. 5D enables a user to connect a chain of source devices (linked using at least one multi-stream channel supporting HDMI-CEC) to a chain of display devices, such that when none of the source devices is active, each display device may control all of the source devices, and when a first display device communicates with a first source device using HDMI-CEC, a second display device can still communicate with the other source devices using HDMI-CEC.

Methods for Implementing a Multi-Stream Link.

A multi-stream manipulating switch may be connected to a multi-stream channel supporting CEC. The multi-stream channel supporting HDMI-CEC may be implemented using any appropriate technique, as long as the transmitted streams are HDMI-CEC compatible. A multi-stream channel supporting HDMI-CEC may be created using solutions for transmitting HDMI-CEC signals over media such as twisted-pair cables, coax cables, optical fibers, and/or implemented using a wireless solution.

Some examples of methods and systems suitable for HDMI-CEC compatible transmissions over a twisted pair cable are available in U.S. patent application Ser. No. 11/703, 080, filed on Feb. 7, 2007, which is incorporated herein by reference in its entirety for all that it teaches without exclusion of any part thereof.

Some examples of methods and systems suitable for HDMI-CEC compatible transmissions over optical fibers are available in US patent application publication number US20070233906, which is incorporated herein by reference in its entirety for all that it teaches without exclusion of any part thereof.

Some examples of methods and systems suitable for HDMI-CEC compatible transmissions through wireless communication are available in PCT patent application publication number WO/2006/101801, which is incorporated herein by reference in its entirety for all that it teaches without exclusion of any part thereof.

Examples of Basic CEC Manipulation Functions

In one embodiment, the manipulating switch utilizes one or more of the following four CEC manipulation functions.

1) CEC Propagation Control.

The CEC propagation control function enables the manipulating switch to receive a CEC block which was initiated by a certain device; and pass or intercept the received CEC block to a certain device(s), optionally on the fly, and without modifying the received block. For example, the manipulating switch may divide the HDMI-CEC cluster tree into multiple HDMI-CEC cluster trees and may control the propagation of the CEC blocks between the multiple HDMI-CEC cluster trees; the multiple HDMI-CEC cluster trees may partially overlap.

Figure 6A:
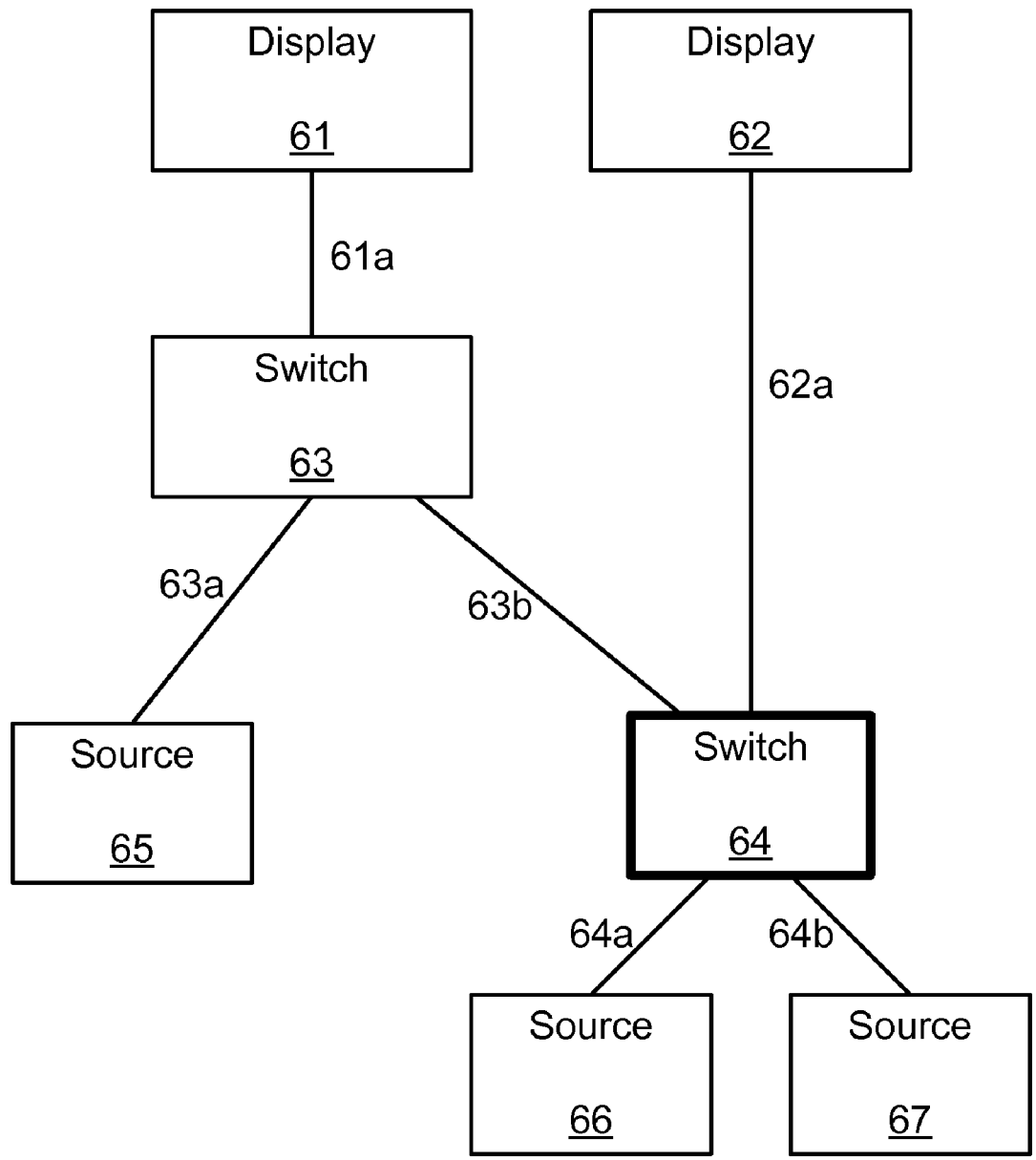
FIGS. 6A-C illustrate HDMI-CEC network views in accordance with one embodiment of the invention.

Referring to FIG. 6A, assume that manipulating switch 64 controls two HDMI-CEC cluster trees. The first HDMI-CEC cluster tree includes source devices 66 and 67 and display device 62. The second HDMI-CEC cluster tree includes source devices 65, 66 and 67 and display device 61. Utilizing the CEC propagation control function, the manipulating switch 64 controls the propagation of CEC blocks within each of the HDMI-CEC cluster trees and the propagation of CEC blocks between the various HDMI-CEC cluster trees. This means that the manipulating switch may forward certain CEC blocks to some source or display devices and not forward the certain CEC blocks to other source or display devices it is connected to.

Figure 17:
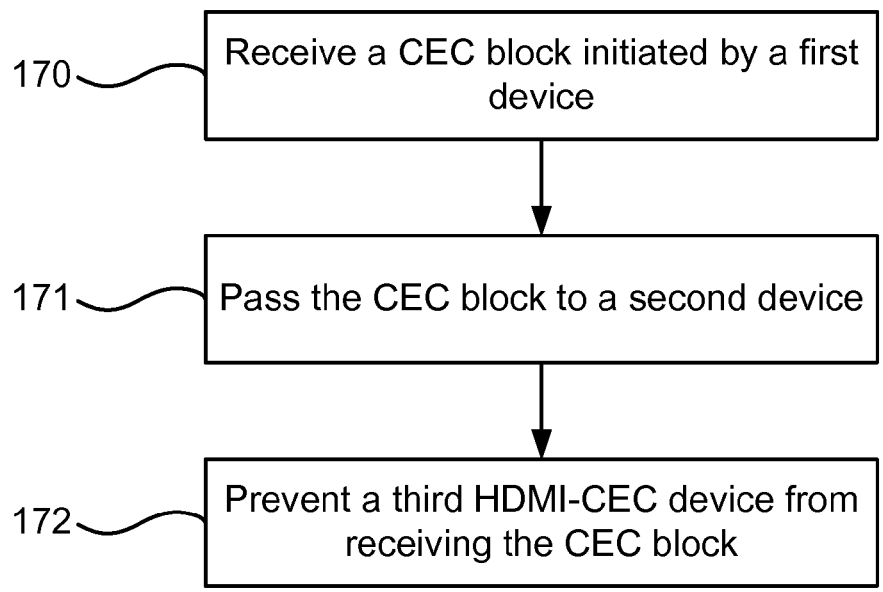
FIG. 17 is a flow diagram of a propagation control method in accordance with one embodiment of the invention.
Figure 18:
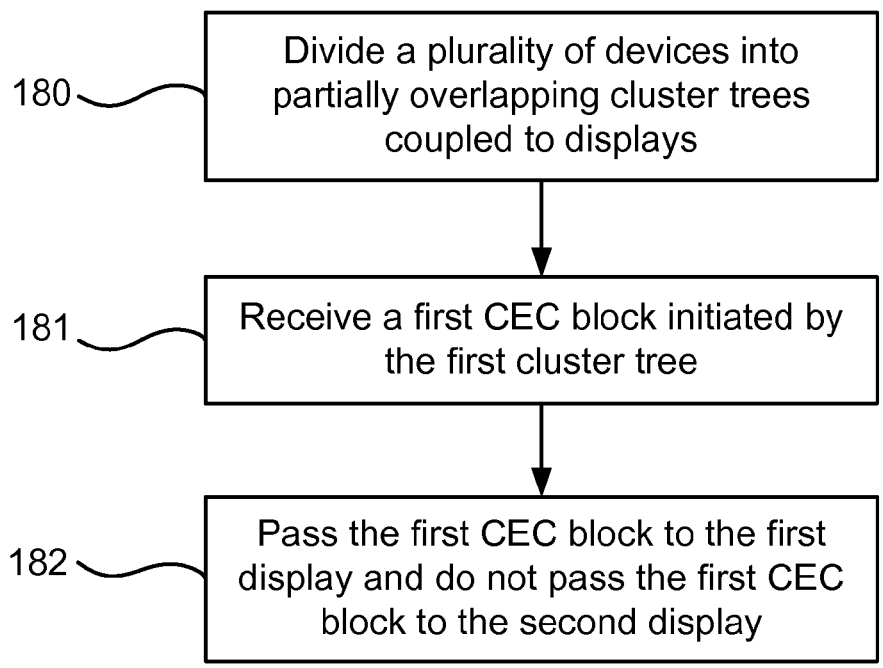
FIG. 18 is a flow diagram of a propagation control method in accordance with one embodiment of the invention.

FIG. 17 is a flow diagram illustrating one method comprising the following steps: In step 170, receiving a CEC block which was initiated by a first HDMI-CEC device. In step 171, passing the received CEC block to a second HDMI-CEC device. And in step 172, preventing a third HDMI-CEC device from receiving the CEC block FIG. 18 is a flow diagram illustrating one method comprising the following steps: In step 180, dividing a plurality of devices into at least a first HDMI-CEC cluster tree coupled to a first display device, and a second HDMI-CEC cluster tree coupled to a second display device, wherein the HDMI-CEC cluster trees partially overlap. In step 181, receiving a first CEC block which was initiated by the first HDMI-CEC cluster tree. In step 182, passing the first CEC block to the first display device not passing the first CEC block to the second display device.

2) CEC on the Fly Modification.

The CEC on the fly modification function enables the manipulating switch to: (i) receive a CEC block which was initiated by a certain device, (ii) modify one or more bits in the received CEC block, optionally on the fly, and (iii) supply the modified CEC block to a certain device(s).

For example, a source device is associated with two HDMI-CEC network views through a manipulating switch, and the source device holds different logical addresses for each HDMI-CEC network view. When a display device, associated with the first HDMI-CEC network view, transmits a CEC message to the source device, that stores a logical address matching the second HDMI-CEC network view, the manipulating switch may replace the CEC destination address with the address matching the second HDMI-CEC network view, such that the source device will identify the CEC message as addressed to it. When, or immediately after, the manipulating switch receives the CEC block containing the four bits of source address and the four bits of destination address, it can determine whether the block was correctly or incorrectly modified. If the block was incorrectly modified, the manipulating switch drops the CEC message, optionally by changing one or more of the address bits or using a <feature abort> message. On the fly modification may also be applied to downstream CEC messages (e.g. from the source device to the display device). In this case, the source device transmits a CEC message using the logical addresses it stores. Then, the manipulating switch may modify the source and/or destination addresses according to addresses matching the recipient's HDMI-CEC network view.

As explained in the HDMI spec 1.3, a transaction on a CEC line involves an initiator and one or more followers. The initiator is responsible for sending the message structure and the data (sometimes both of them referred to herein as data). The follower is the recipient of the data and is responsible for setting any acknowledgement bits.

Figure 19:
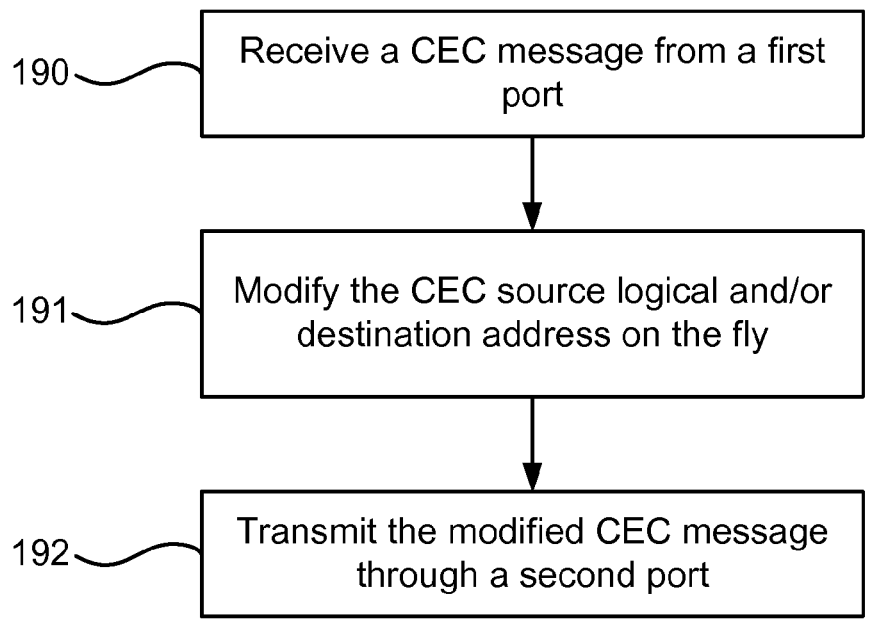
FIG. 19 is a flow diagram of a CEC on the fly modification method in accordance with one embodiment of the invention.

FIG. 19 is a flow diagram illustrating one method comprising the following steps:

In step 190, receiving a CEC message from a first HDMI-CEC port, the CEC message comprising data according to the initiator's HDMI-CEC network view. In step 191, modifying the CEC data, approximately on the fly, to match the follower's HDMI-CEC network view. Optionally, the data is selected from the group of CEC source logical address, or CEC destination logical address, or CEC source logical address and CEC destination logical address. And in step 192, transmitting the modified CEC message through a second HDMI-CEC port.

3) CEC Block Termination.

The CEC block termination function enables the manipulating switch to receive a CEC block which was initiated by a certain device; optionally acknowledge (ACK) the block; modify the received block; and supply the modified blocks to a certain device(s). Optionally, a few blocks or all the blocks comprising the CEC may be partially or completely modified. Alternatively, only a section of the block may be modified, for example, only the header containing the logical addresses may be modified.

In one embodiment, although the manipulating switch modifies the received block, the source address still matches the source address of the original initiator of the block and not the source address of the manipulating switch.

In one embodiment, a transmission is stopped using CEC Line Error Handling, such as defined in HDMI spec 1.3 paragraph CEC 7.4. CEC line error handling enables a device acting as follower to notify all other devices (primarily the initiator) that a potential error has occurred, where an error is defined as a period between falling edges that is shorter than a minimum data bit period.

Figure 20:
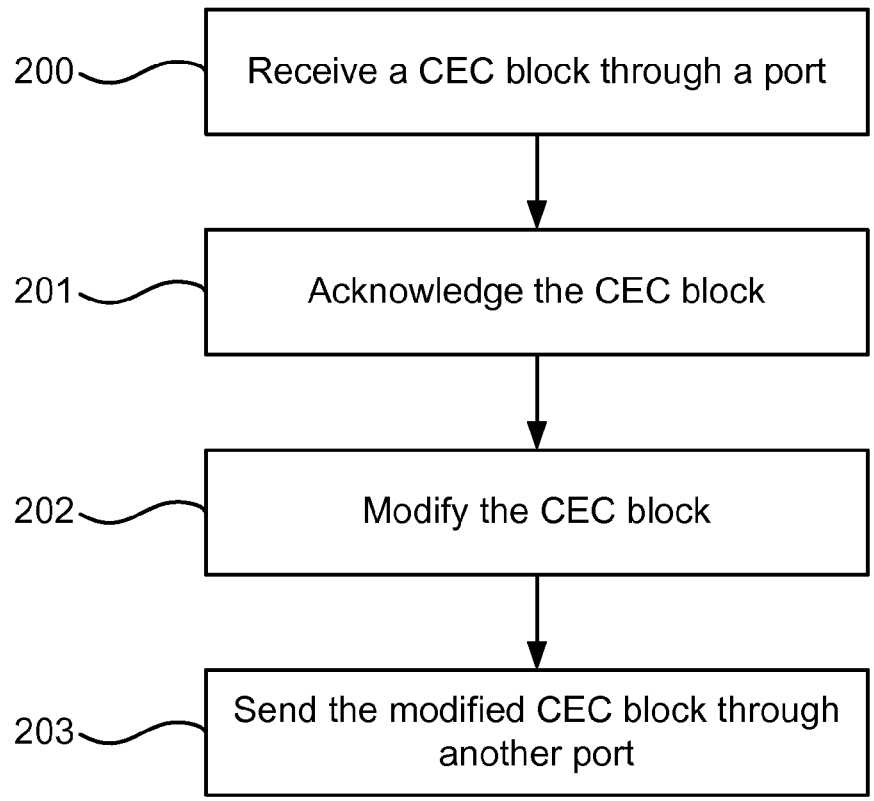
FIG. 20 is a flow diagram of a CEC block termination method in accordance with one embodiment of the invention.

FIG. 20 is a flow diagram illustrating one method comprising the following steps: In step 200, receiving a CEC block through a first HDMI-CEC port and in step 201, acknowledging the CEC block. In step 202 modifying one or more bits in the received CEC block. And in step 203, sending the modified CEC block through at least a second HDMI-CEC port.

Figure 21:
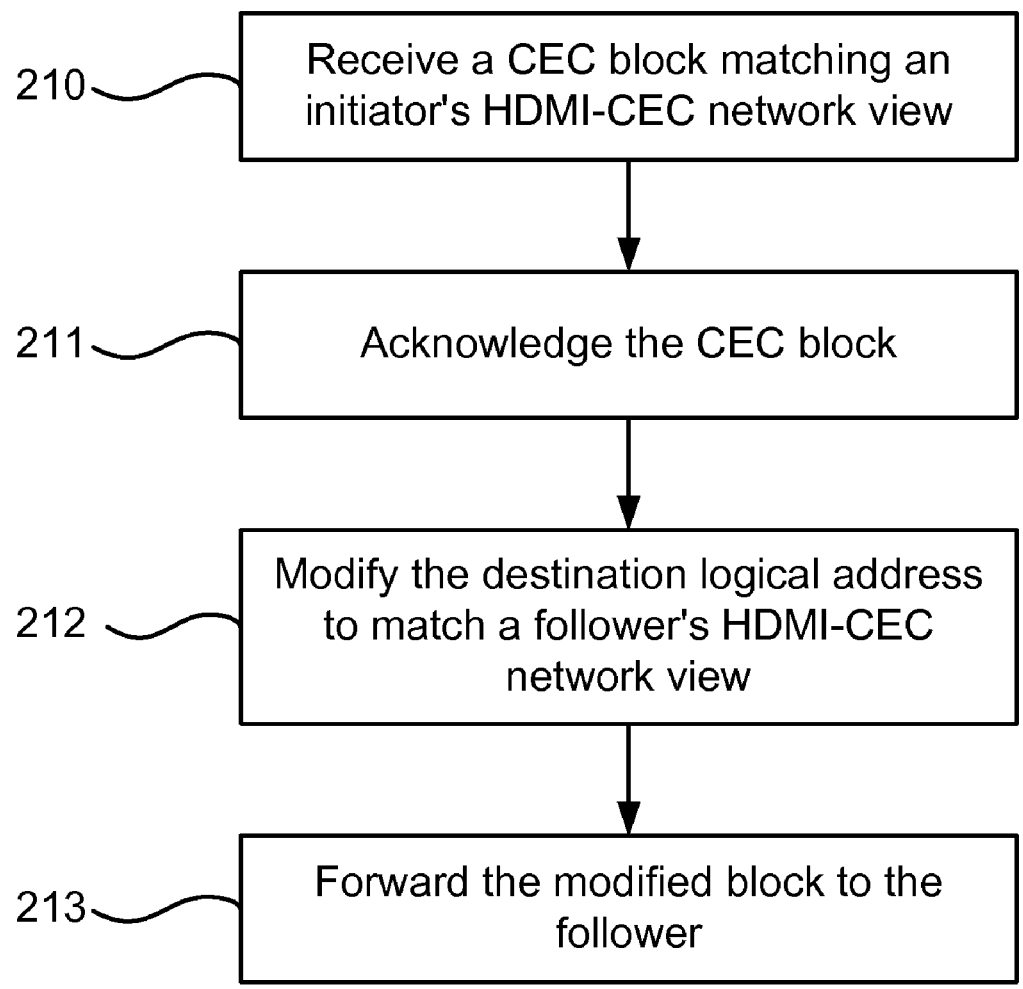
FIG. 21 is a flow diagram of a method in accordance with one embodiment of the invention.

FIG. 21 is a flow diagram illustrating one method comprising the following steps: In step 210, receiving a CEC block comprising a destination logical address matching the initiator's HDMI-CEC network view. In step 211, acknowledging the CEC block. In step 212, modifying the destination logical address to match the follower's HDMI-CEC network view. And in optional step 213, forwarding the modified block to the follower.

4) CEC Message Generation.

The CEC message generation function enables the manipulating switch to self generate one or more CEC blocks or one or more CEC messages, and supply the generated CEC message to a certain device(s). Optionally, the self generated CEC message is not initiated directly by a CEC message received by the manipulating switch. For example, the manipulating switch may generate a CEC message in order to perform one or more of the following: create an HDMI-CEC network view for a device, emulate a CEC message from a device, assign physical address to a CEC device, or spoof the HDMI-CEC cluster tree. By learning the HDMI network, the manipulating switch may create spoofed CEC transactions and/or spoof the address allocation process.

For example, referring again to FIG. 6A as an illustration of an HDMI-CEC network with two display devices 61 and 62, display device 61 may be accessed by all source devices in the network and display device 62 may be accessed only by source devices 66 and 67. While display device 61 retrieves its HDMI-CEC network view using the normal HDMI-CEC procedure, manipulating switch 64 prevents display device 62 from receiving the CEC transactions used for creating the HDMI-CEC network view exposed to display device 61, optionally using the CEC propagation control function. During that process, manipulating switch 64 may learn the HDMI-CEC network topology and create spoofed CEC transactions used for creating the HDMI-CEC network view exposed to display device 62, optionally using the CEC message generation function.

As another example, the manipulating switch may create an appropriate HDMI-CEC network view for each downstream and/or upstream path. In one embodiment, the manipulating switch creates the appropriate HDMI-CEC network view by spoofing CEC transactions using the CEC <report physical address> message that causes the addressed CEC device to report, to the other CEC devices in the HDMI-CEC cluster tree, the connection between its HDMI physical address and its CEC logical address.

Figure 6B:
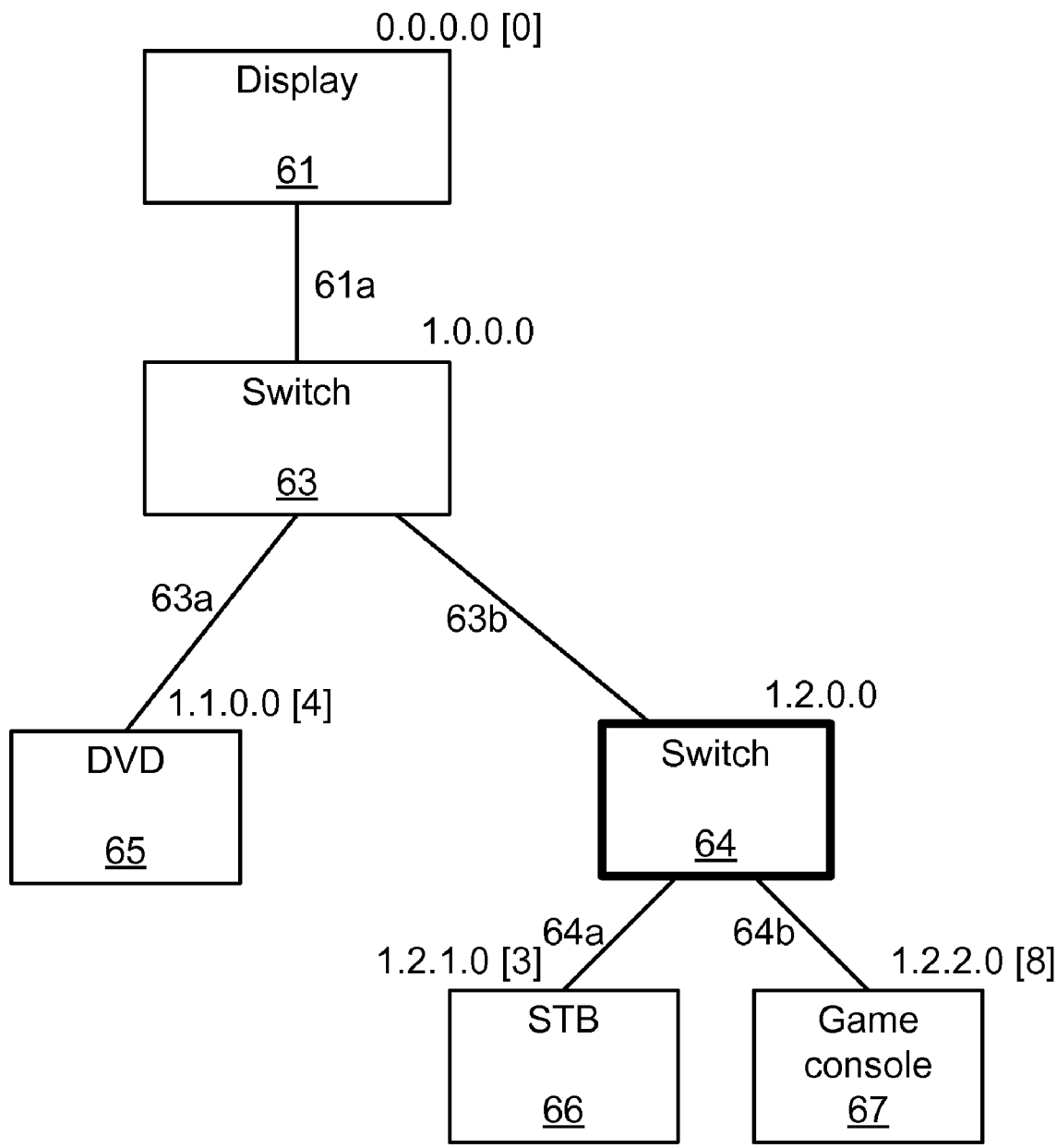
Figure 6C:
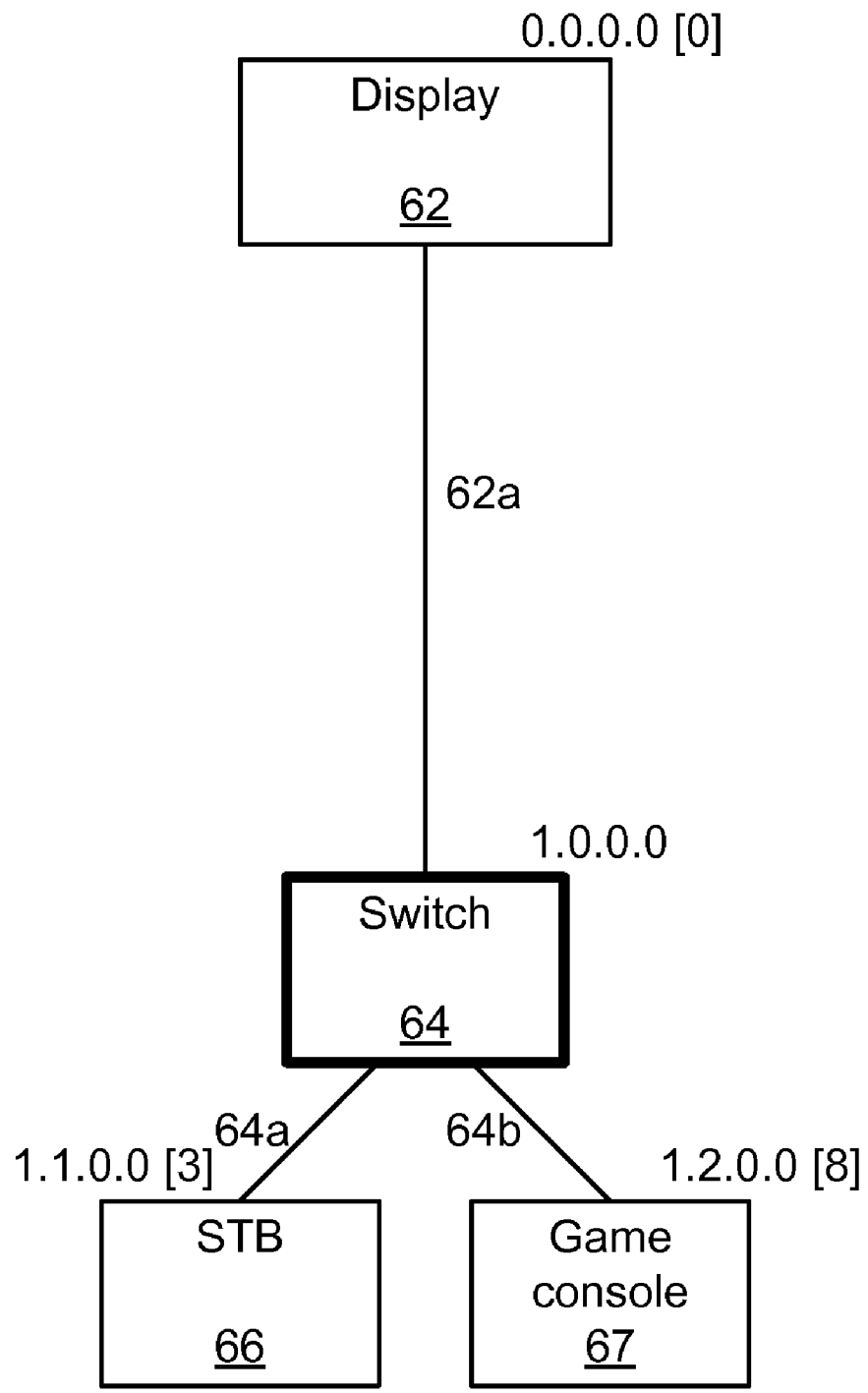

In one example, FIGS. 6A-C illustrate manipulating switch 64 spoofing the CEC transactions for display device 62, optionally using the CEC "report physical address" message. In this example, display device 61 receives an HDMI-CEC network view as if it were the only display device connected to the HDMI-CEC cluster tree, while display device 62 also receives an HDMI-CEC network view as if it were the only display device connected to the HDMI-CEC cluster tree.

FIG. 6B illustrates the HDMI-CEC network view of display device 61, where the physical addresses are denoted by a four digit number and the logical addresses are denoted inside brackets. The manipulating switch 64 makes sure that the various source devices receive the right physical addresses using the HDMI EDID distribution process with the EDID of display device 61. After retrieving its physical address, each source device may assign itself a CEC logical address as known in the art. Then, each source device reports the connection between its logical and physical addresses using the <report physical address> CEC message. In the HDMI-CEC network view of display device 61 illustrated by FIG. 6B, switch 63 receives the physical address 1.0.0.0, DVD 65 receives the physical address 1.1.0.0 and the logical address 4, switch 64 receives the physical address 1.2.0.0, STB 66 receives the physical address 1.2.1.0 and the logical address 3, and game console 67 receives the physical address 1.2.2.0 and the logical address 8.

FIG. 6C illustrates the spoofed HDMI-CEC network view of display device 62, where the physical addresses are denoted by a four digit number and the logical addresses are denoted inside brackets. HDMI-CEC does not support a multiple display architecture, therefore, the manipulating switch 64 spoofs the HDMI-CEC network view of display device 61 by self generating the appropriate CEC blocks that are supposed to be received and transmitted by source devices 66 and 67. In the HDMI-CEC network view of display device 62 illustrated by FIG. 6C, switch 64 receives the physical address 1.0.0.0, STB 66 receives the physical address 1.1.0.0 and the logical address 3, and game console 67 receives the physical address 1.2.0.0 and the logical address 8.

In one embodiment, the manipulating switch tries to maintain the same physical address and/or logical address assigned to each device in each of the HDMI-CEC network views. For example, source devices 66 and 67 in FIGS. 6B and 6C have the same logical addresses.

Examples of CEC Manipulation Operations

In some embodiments, one or more of the four basic CEC manipulation functions described above are used for the following CEC manipulation operations.

Manipulating the HDMI-CEC Network View.

Figure 7:
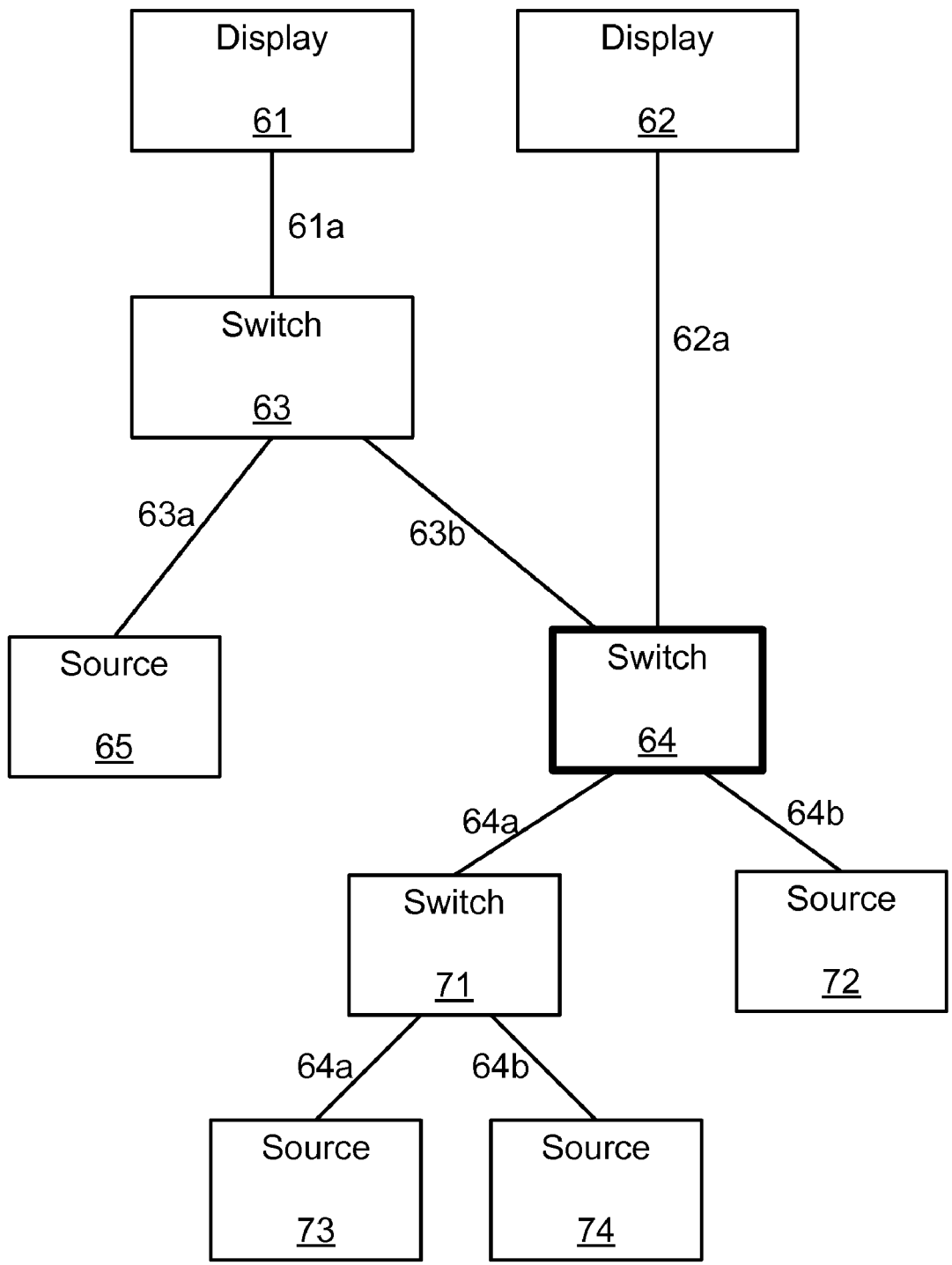
FIG. 7 illustrates a multi display network in accordance with one embodiment of the invention.

In one embodiment, the manipulating switch manipulates the active sources existing in the HDMI-CEC network view of each display device. FIG. 7 illustrates a case where display device 61 receives data from source device 73. Because HDMI link 64a can carry only one stream, manipulating switch 64 has to disconnect the entire HDMI-CEC cluster tree connected by HDMI link 64a from the HDMI-CEC network view of display device 62. In other words, the HDMI-CEC network view of display device 62 is manipulated according to the source-display stream activity and network topology.

In one embodiment, when a source device starts transmitting to a first display device, the manipulating switch may change the physical addresses of the rest of the network such that the rest of the network will be ready to transmit to the second display device. Alternatively, when a source device starts transmitting to a first display device, updating the physical addresses of the specific source device and its downstream devices is sufficient and there is no need to update the entire network regarding the change in the physical address of the active source device.

Figure 22:
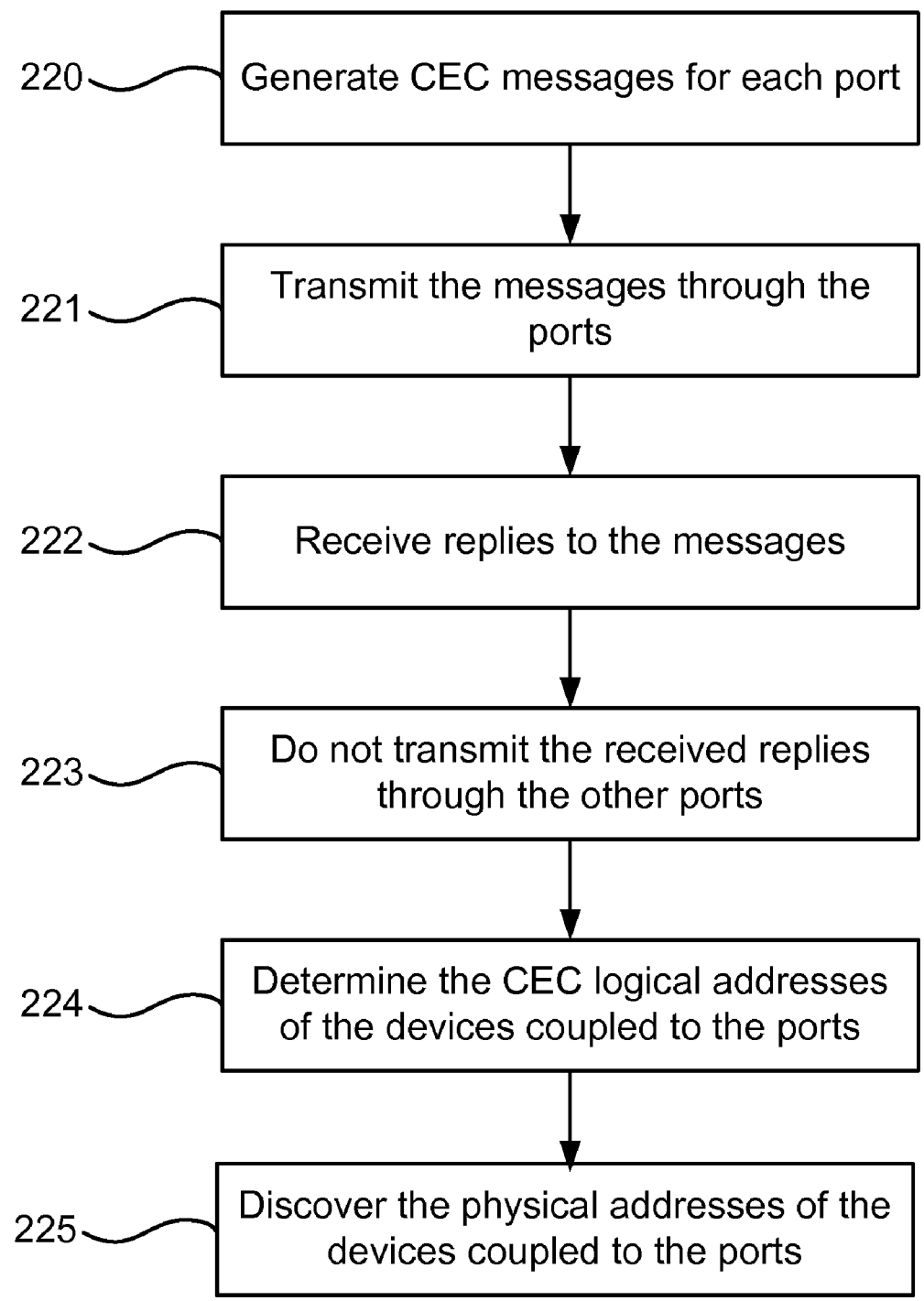
FIG. 22 is a flow diagram of an addresses allocation method in accordance with one embodiment of the invention.

FIG. 22 is a flow diagram illustrating one method for discovering the CEC logical addresses of HDMI-CEC devices coupled to at least two HDMI-CEC ports of a manipulating switch, the method comprising performing the following steps for each HDMI-CEC port: In step 220, generating CEC messages, wherein the generated CEC messages are optionally CEC polling messages. In step 221, transmitting the generated CEC messages through the HDMI-CEC port. In step 222, receiving replies to the transmitted CEC messages. In step 223, not transmitting the received replies through the other HDMI-CEC ports. In step 224, determining the CEC logical addresses of the HDMI-CEC devices coupled to the HDMI-CEC port from the received replies. And in optional step 225, discovering the physical addresses of the HDMI-CEC devices coupled to the HDMI-CEC ports using CEC <Give Physical Address> messages.

In one embodiment, the following method steps are performed: Maintaining, by a manipulating switch, a first HDMI-CEC network view of a first HDMI-CEC display device and a second HDMI-CEC network view of a second HDMI-CEC display device, wherein the first and the second HDMI-CEC network views comprise a first HDMI-CEC source device that is common to both HDMI-CEC network views, whereby the common device defines the overlapping HDMI-CEC cluster tree. And approximately while there is TMDS communication between the first HDMI-CEC source device and the first HDMI-CEC display device, disconnecting the HDMI-CEC sub cluster tree associated with a first HDMI-CEC input port of the manipulating switch, which comprises the first HDMI-CEC source device, from the HDMI-CEC devices located in a second non-overlapping HDMI-CEC cluster tree. Optionally, the step of disconnecting the HDMI-CEC sub cluster tree may occur approximately when identifying one or more of the following CEC messages: <set stream path>, <active source>, <image view on>, or <text view on>.

Assigning the Same Physical Addresses to Different HDMI-CEC Cluster Trees.

In one embodiment, CEC propagation control is used with CEC broadcast messages, such as "report physical address", and when at least two subsets of at least two overlapping or partially overlapping HDMI-CEC network views share the same physical and logical addresses or share the same logical addresses. Therefore, the manipulating switch tries to create a situation where the same device holds the same physical and logical addresses, or just the same logical address, in two or more HDMI-CEC network views.

Referring to FIG. 7 as an example, the manipulating switch 64 may identify the more complicated physical address tree of the two HDMI-CEC cluster trees, optionally by comparing the physical address received in the HDMI output port connected to 63b with the physical address received in the HDMI output port connected to 62a. Then the manipulating switch assigns its upstream devices physical addresses meeting the more complicated physical address tree. In the example of FIG. 7 the more complicated physical address tree is the HDMI-CEC cluster tree of display device 61. Then the manipulating switch generates spoofed report physical address CEC messages that are transferred to the less complicated physical address tree, which is the HDMI-CEC cluster tree of display device 62 in the example of FIG. 7. The manipulating switch 64 may create the HDMI-CEC network view of display device 62 by generating "report physical address" CEC messages that are transferred to the display device 62.

In one embodiment, a method for assigning a required physical address to an HDMI-CEC device, comprising: determining by a manipulating switch the required HDMI physical address to be assigned to an upstream HDMI-CEC device, and providing the required HDMI physical address to the upstream HDMI-CEC device. Wherein the required HDMI physical address is different from the true HDMI physical address that should have been assigned according to the standard HDMI procedure for computing an HDMI physical address.

In one embodiment, a method operating a network comprising at least two HDMI-CEC display devices with their associated at least two HDMI-CEC cluster trees that at least partially overlap, comprising: identifying a set of HDMI physical addresses to be assigned to the HDMI-CEC devices in at least one upstream HDMI-CEC sub cluster tree of a manipulating switch, whereby these HDMI physical addresses will be consistent in the HDMI-CEC network views of the first and the second HDMI-CEC display devices.

Manipulating the Logical Address of a Device in the HDMI-CEC Cluster Tree.

The logical address of a device describes the device's functionality. The HDMI-CEC cluster tree is limited in the total number of devices it can contain (for example up to 10 devices) and in the number of devices of the same type it can contain (for example one audio system and four tuners). For example, section "CEC 10.2 Logical Addressing" in the HDMI specification version 1.3a describes the available logical addresses.

Referring again to FIG. 7, assuming source devices 65, 72, 73, and 74 are playback devices, but the HDMI-CEC cluster tree supports only up to 3 playback devices. Therefore, display device 61 should see only three source devices, while display device 62, which cannot receive streams from source device 65 (because HDMI link 63b is asymmetric), should see all the three source devices from which it can receive streams (72, 73, 74). Assuming source device 72 is disconnected from the HDMI-CEC cluster tree, source devices 65, 73 and 74 are visible to display device 61, while only source devices 73 and 74 are visible to display device 62. When source device 72 is connected to the HDMI-CEC cluster tree, manipulating switch 64 sees source devices 73, 74 and 72, but the HDMI-CEC network view of display device 61 cannot include 4 playback devices in a standard HDMI-CEC cluster tree and this may be solved by one of the following two non-limiting examples.

A first example of assigning a valid logical address includes the following steps:

Playback device 72 wakes up and because HDMI-CEC cluster tree of display device 61 already contains three playback devices, playback device 72 cannot allocate a playback device CEC logical address.

While playback device 72 tries to receive its appropriate logical address, the other sources identify themselves, and as a result the manipulating switch 64 holds an updated network topology of the source devices having the same function.

Then manipulating switch 64 checks if it is possible to assign to playback device 72 a logical address in the HDMI-CEC cluster tree of display device 62, so that the HDMI-CEC network view of display device 62 will include playback device 72 with its true logical address. This may be possible because source device 65 is under switch 63 and therefore is not accessible by display device 62.

If it is possible, the manipulating switch 64 causes playback device 72 to reinitialize itself using the HPD signal, and then the manipulating switch 64 emulates the entire HDMI-CEC cluster tree of display device 62 in order for playback device 72 to receive the appropriate logical address. One example of an address allocation process includes the following steps: playback device 72 attempts to acquire a logical address by sending polling message to that address, and the manipulating switch 64 generates an answer for the logical addresses it does not want playback device 72 to acquire.

After source device 72 receives its appropriate logical address, the manipulating switch 64 may emulate source device 72 in order to notify display device 62 of the logical address of source device 72.

A second example of assigning a valid logical address includes the following steps:

Still referring to FIG. 7, manipulating switch 64 creates for itself the downstream HDMI-CEC network view through his HDMI outputs, and calculates the logical addresses it should assign to the upstream devices (72, 73, and 74).

Source device 72 wakes up as an HDMI-CEC device and the manipulating switch 64 assigns to source device 72 an address according to its preferences, by emulating the entire HDMI-CEC cluster tree.

Then the manipulating switch 64 checks whether a downstream device already owns the address assigned to source device 72. If a downstream device already owns the address, manipulating switch 64 repeats the process so that source device 72 will receive a different address.

Figure 8:
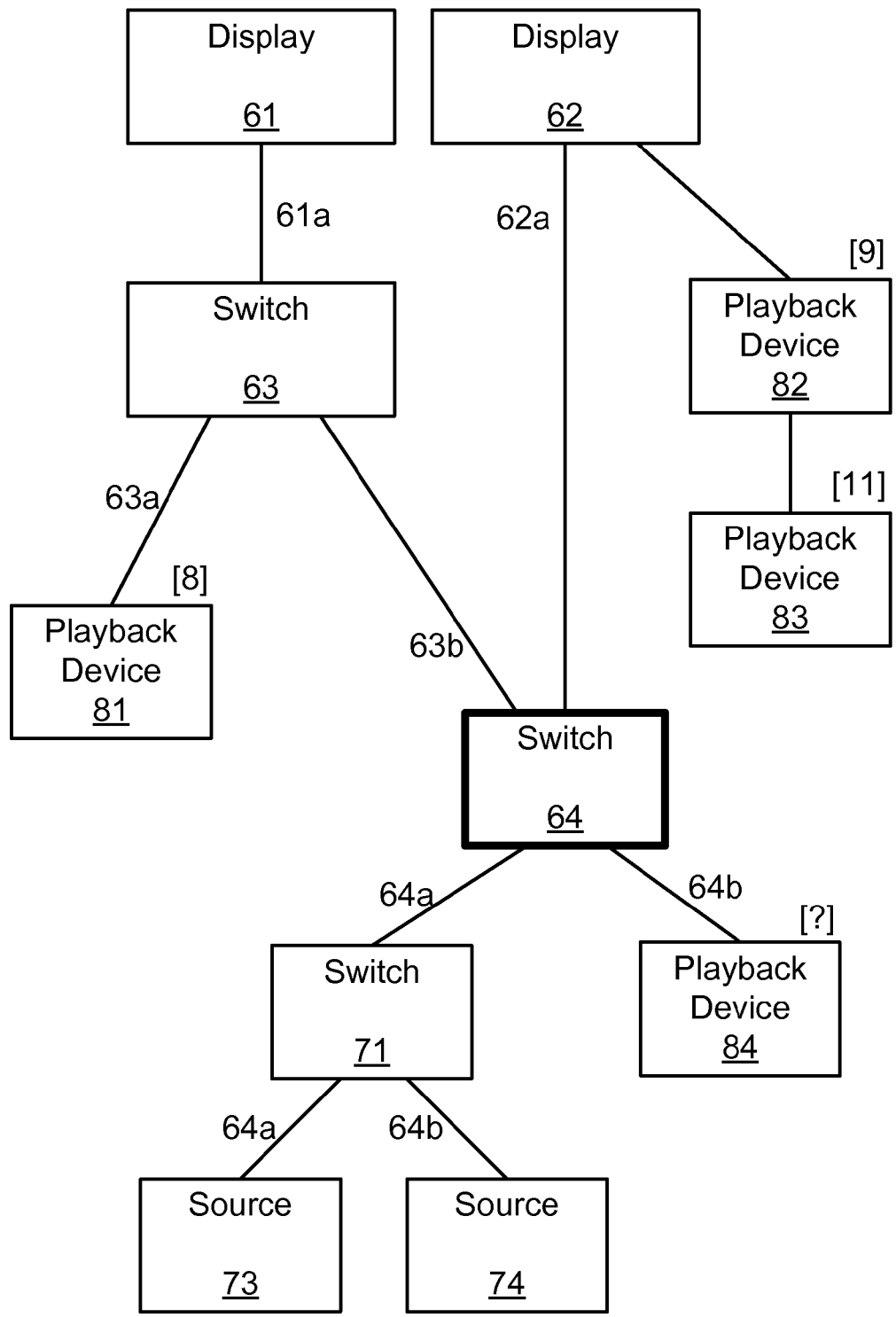
FIG. 8 illustrates a multi display network in accordance with one embodiment of the invention.

FIG. 8 illustrates a network example where a maximum number of 3 playback devices (having CEC logical addresses 8, 9, and 11) is allowed and already assigned to playback devices 81, 82, and 83. When playback device 84 connects to the network, the manipulating switch 64 has no available playback device logical address that is valid for both HDMI-CEC cluster trees. Therefore, the manipulating switch 64 assigns playback device 84 a logical address that meets one of the HDMI-CEC cluster trees and spoofs the other HDMI-CEC cluster tree. For example, manipulating switch 64 may actually assign the logical address 9 to playback device 84, which is accepted by the HDMI-CEC network view of display device 61, and spoof the HDMI-CEC network view of display device 62 to believe that playback device 84 holds the logical address 8.

Figure 24:
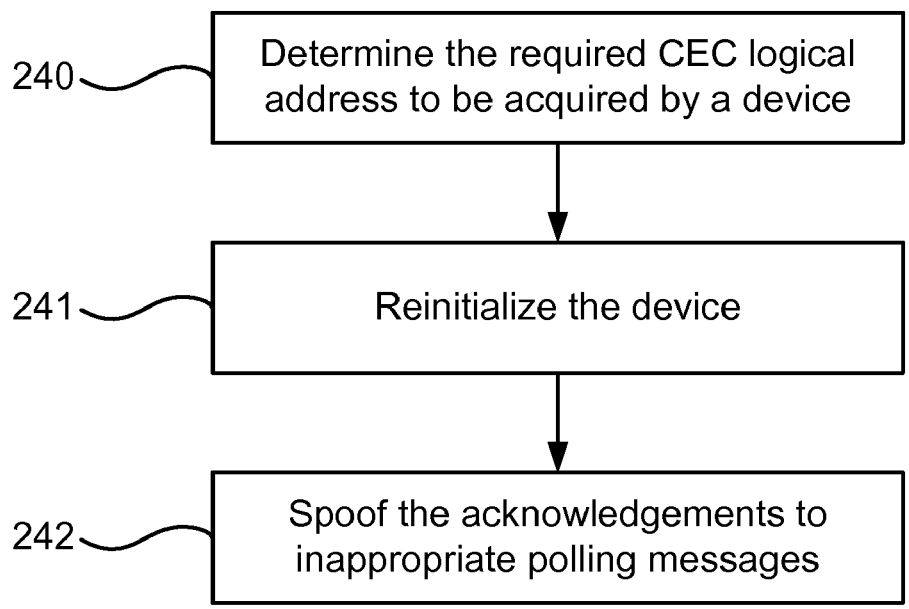
FIG. 24 is a flow diagram of a logical addresses acquiring method in accordance with one embodiment of the invention.

FIG. 24 is a flow diagram illustrating one method for assigning a required CEC logical address to an HDMI-CEC source device, comprising the following steps: In step 240, determining the required CEC logical address to be acquired by the HDMI-CEC source device. In step 241, reinitializing the HDMI-CEC source device to acquire a CEC logical address utilizing polling messages. And in step 242, spoofing the acknowledgements to polling messages containing CEC logical addresses other than the required CEC logical address.

Figure 23:
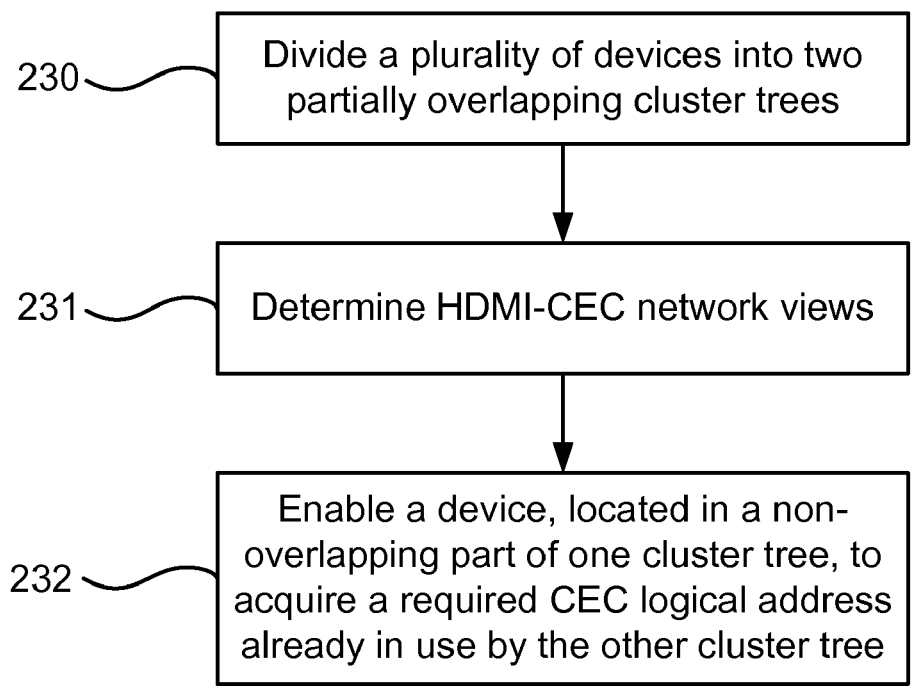
FIG. 23 is a flow diagram of a logical addresses acquiring method in accordance with one embodiment of the invention.

FIG. 23 is a flow diagram illustrating one method comprising the following steps: In step 230, dividing, by a manipulating switch, a plurality of HDMI-CEC devices into at least a first HDMI-CEC cluster tree coupled to a first HDMI-CEC display device, and a second HDMI-CEC cluster tree coupled to a second HDMI-CEC display device, wherein the HDMI-CEC cluster trees partially overlap. In step 231, determining a first and a second HDMI-CEC network view for the first and the second HDMI-CEC display devices, whereby the two HDMI-CEC network views partially overlap. And in step 232, enabling a second HDMI-CEC source device in the second HDMI-CEC cluster tree to acquire a required CEC logical address already in use by a first HDMI-CEC source device in the first HDMI-CEC cluster tree, wherein the first and the second HDMI-CEC source devices are located in the non-overlapping parts of the HDMI-CEC network views.

Assigning the Correct EDID to an Active Source.

In one embodiment, if a first display device sends a CEC <set stream path> message to a source device but the source device does not store the correct EDID of the first display device, the manipulating switch emulates the HDMI-CEC cluster tree in order to cause the active source device to have the correct EDID of the first display device. The manipulating switch is capable of knowing the correct EDID of the first display device using the I2c interface. Moreover, if the physical address assigned to the source device does not meet the HDMI-CEC network view of the first display device, the manipulating switch may also emulate the HDMI-CEC cluster tree in order to cause the active source device to have the required physical address.

Elimination of a Hierarchic Level in an HDMI-CEC Network View.

Figure 9:
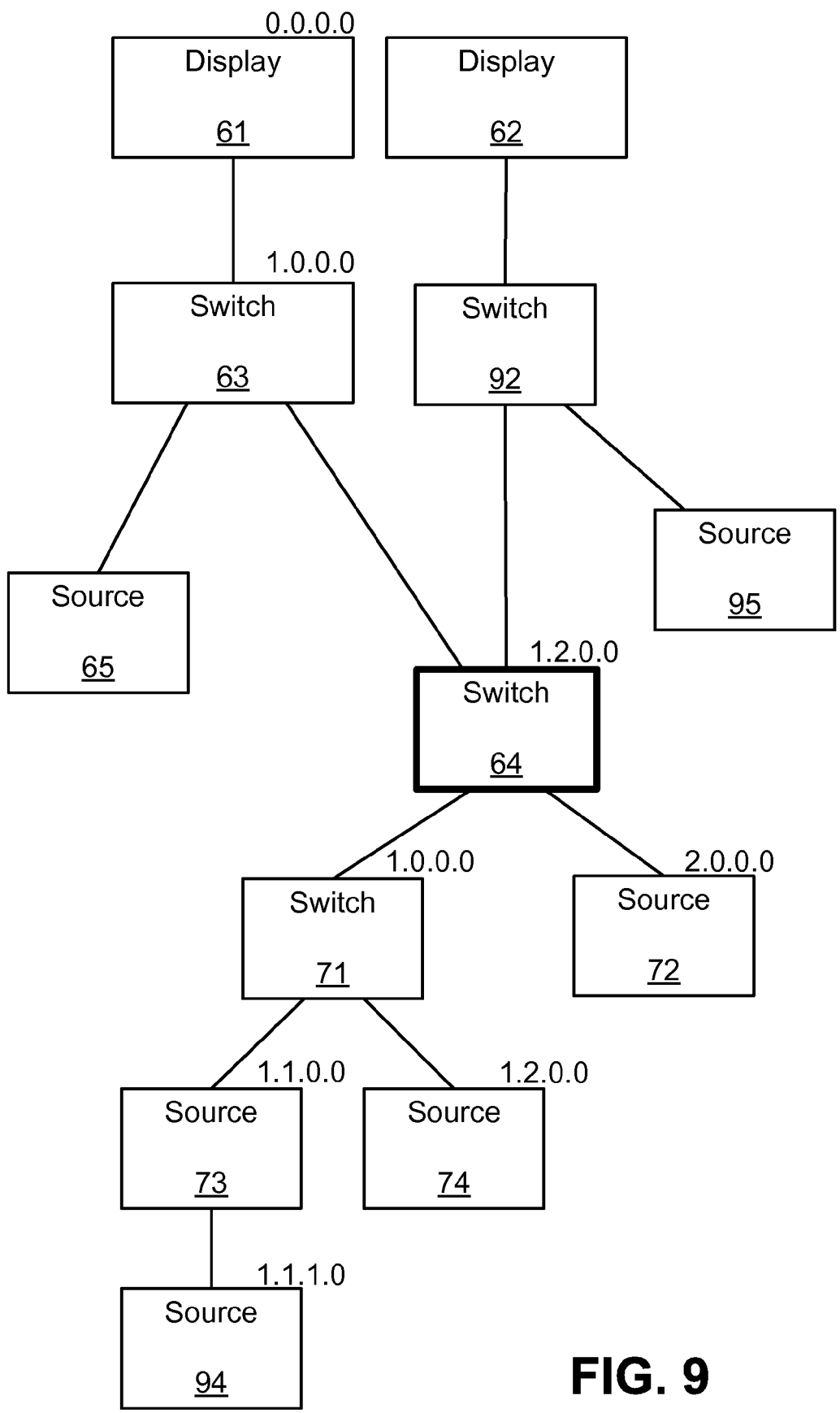
FIG. 9 illustrates a multi display network in accordance with one embodiment of the invention.

HDMI limits the network view to include up to 4 hierarchic levels. In one embodiment, the manipulating switch eliminates one or more hierarchic levels from the HDMI-CEC network view of a display device. FIG. 9 illustrates an example where the HDMI-CEC network views of both display devices 61 and 62 include 5 hierarchic levels. In order to be able to approach and control source device 94 using CEC, the manipulating switch 64 may eliminate, for example, the existence of switch 71 from the HDMI-CEC network views of display devices 61 and 62. FIG. 9 illustrates a case where the manipulating switch 64 spoofs the physical addresses of its upstream and downstream devices. As a result of implementing the physical address spoofing of eliminating the existence of switch 71, the HDMI-CEC network views of both display devices 61 and 62 include no more than 4 hierarchic levels. As a result of implementing the physical address spoofing of eliminating the downstream devices of the manipulating switch 64, it is possible to control devices 71, 72, 73, 74, and 94 using CEC. It is to be understood that the described physical address spoofing method may be implemented on many more hierarchic levels, utilizing more manipulating switches. Moreover, the manipulating switch may always try to eliminate hierarchical levels in order to enable as many hierarchical levels as possible.

In one embodiment, the manipulating switch uses polling messages to verify, maintain and/or discover the CEC logical addresses of the network devices. The manipulating switch may check the logical address(es) from time to time in order to make sure that it stores an updated view of the network.

When the manipulating switch receives a polling message it knows whether it should answer with an ACK or not according to the stored HDMI-CEC network view(s). Referring again to FIG. 8, assume that the manipulating switch 64 receives a polling message from display device 62 containing the logical address of source device 73 in the HDMI-CEC network view of display device 62. The manipulating switch replies with an ACK and does not forward the original message to source device 73 because it actually holds a different logical address in accordance with the HDMI-CEC network view of display device 61. If needed, the manipulating switch may transmit to source device 73 a modified polling message containing its actual address. Similarly, the manipulating switch 64 may process polling messages from an upstream device to a downstream device. For example, a polling message from source device 73 containing the logical address of playback device 83 in the HDMI-CEC network view of display device 62 may be forwarded through HDMI link 62a if the message's address meets the actual address. Alternatively, the manipulating switch replies with an ACK and does not forward the original message to playback device 83. If needed, the manipulating switch may transmit to playback device 83 a modified polling message containing its actual address.

Figure 14:
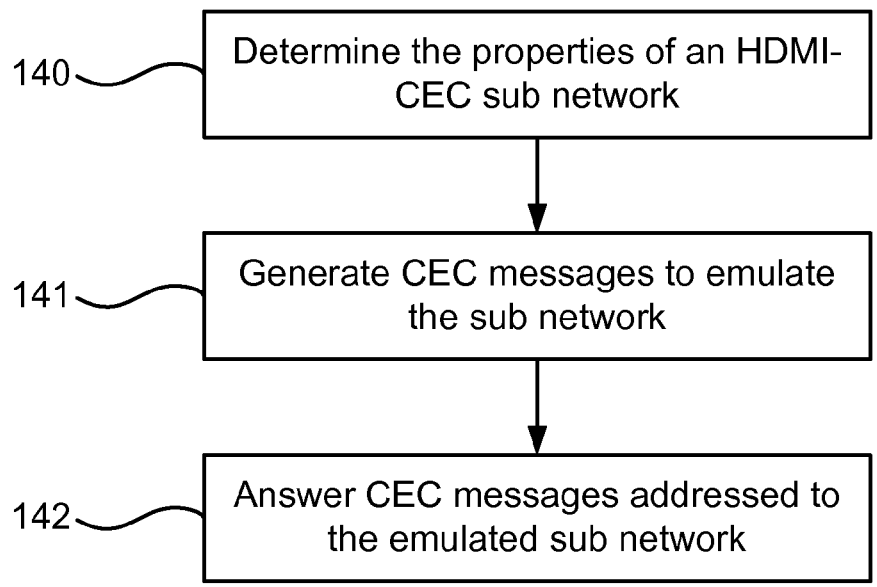
FIG. 14 is a flow diagram of an emulating method in accordance with one embodiment of the invention.

FIG. 14 is a flow diagram illustrating one method for emulating an HDMI-CEC sub network, comprising the following steps: In step 140, determining the properties of the HDMI-CEC sub network. In step 141, generating CEC messages that emulate the CEC messages initiated by the HDMI-CEC sub network. And in step 142, answering CEC messages addressed to the emulated HDMI-CEC sub network.

Figure 25:
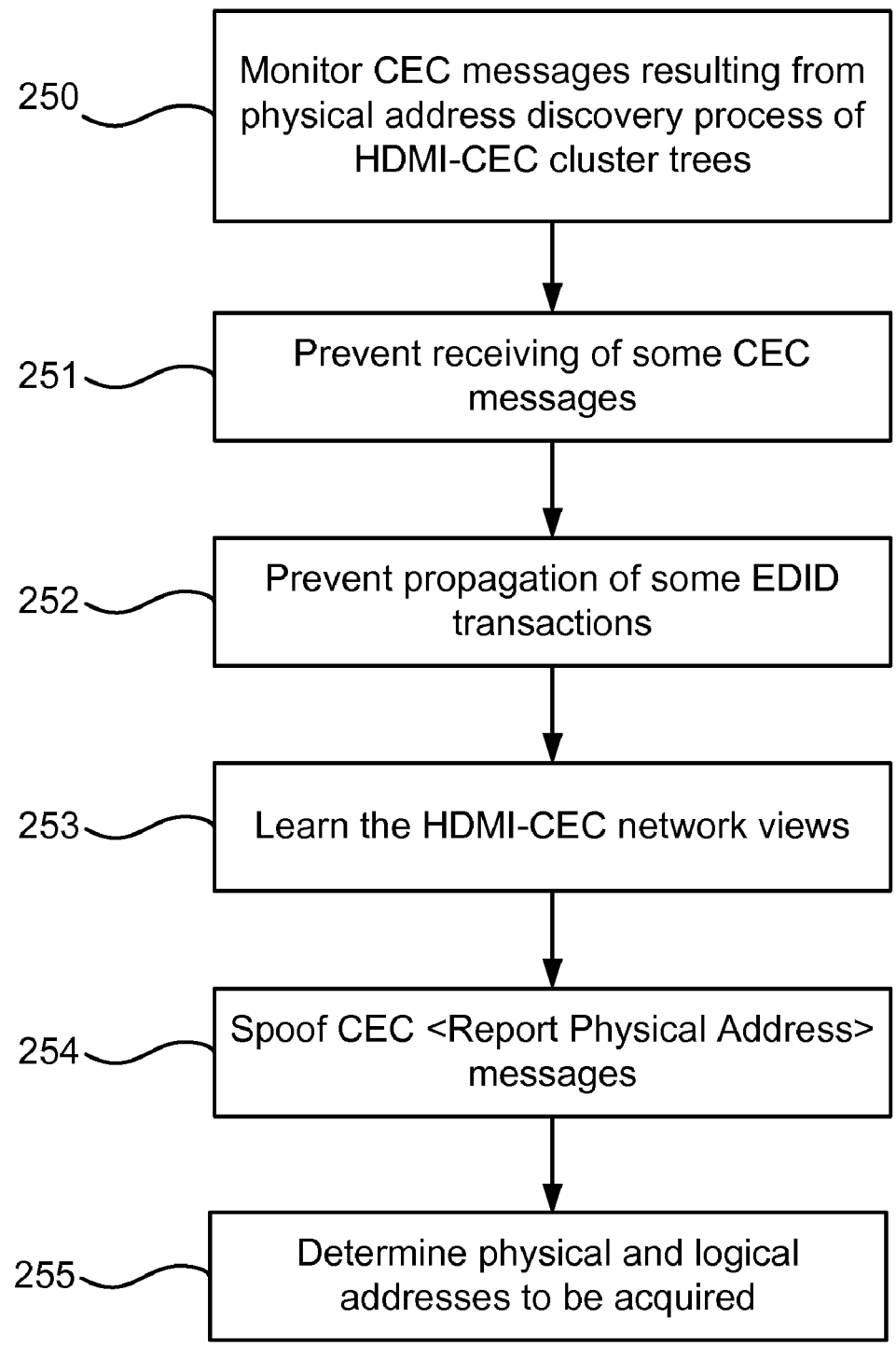
FIG. 25 is a flow diagram of a physical addresses assignment method in accordance with one embodiment of the invention.

FIG. 25 is a flow diagram illustrating one method for manipulating HDMI-CEC messages transmitted over a network comprising at least a first and a second HDMI-CEC display device with their associated first and second HDMI-CEC cluster trees that at least partially overlap, the method comprising the following steps: In step 250, monitoring the CEC <Report Physical Address> messages resulting from the physical address discovery process of the first and the second HDMI-CEC cluster trees. In step 251, preventing the non-overlapping section of the second HDMI-CEC cluster tree from receiving the CEC messages initiated by the first HDMI-CEC cluster tree, and preventing the first HDMI-CEC cluster tree from receiving the CEC messages initiated by the non-overlapping section of the second HDMI-CEC cluster tree. In step 252, preventing propagation of EDID associated with the non-overlapping section of the HDMI-CEC cluster tree to the first HDMI-CEC cluster tree. In step 253, utilizing the CEC <Report Physical Address> messages resulting from the physical address discovery process of the first and the second HDMI-CEC cluster trees for learning the first and the second HDMI-CEC network views. In step 254, spoofing CEC <Report Physical Address> messages from the overlapping section of the HDMI-CEC cluster tree towards the non-overlapping section of the second HDMI-CEC cluster tree. And in optional step 255, determining the preferred physical and logical addresses to be acquired by the HDMI-CEC devices in the overlapping section of the HDMI-CEC cluster tree.

In one embodiment, when a message sender transmits a CEC message to a message recipient, the manipulating switch may intercept one or more of the CEC blocks, and answer with an ACK (the message may be directed downstream or upstream). Then the manipulating switch may transmit an appropriately modified or generated CEC blocks to the message recipient. If the message recipient does not accept the message or cannot perform the request, the manipulating switch may transmit a <feature abort> message to notify the message sender of the failure to execute the message.

Symmetric Channel

Figure 11A:
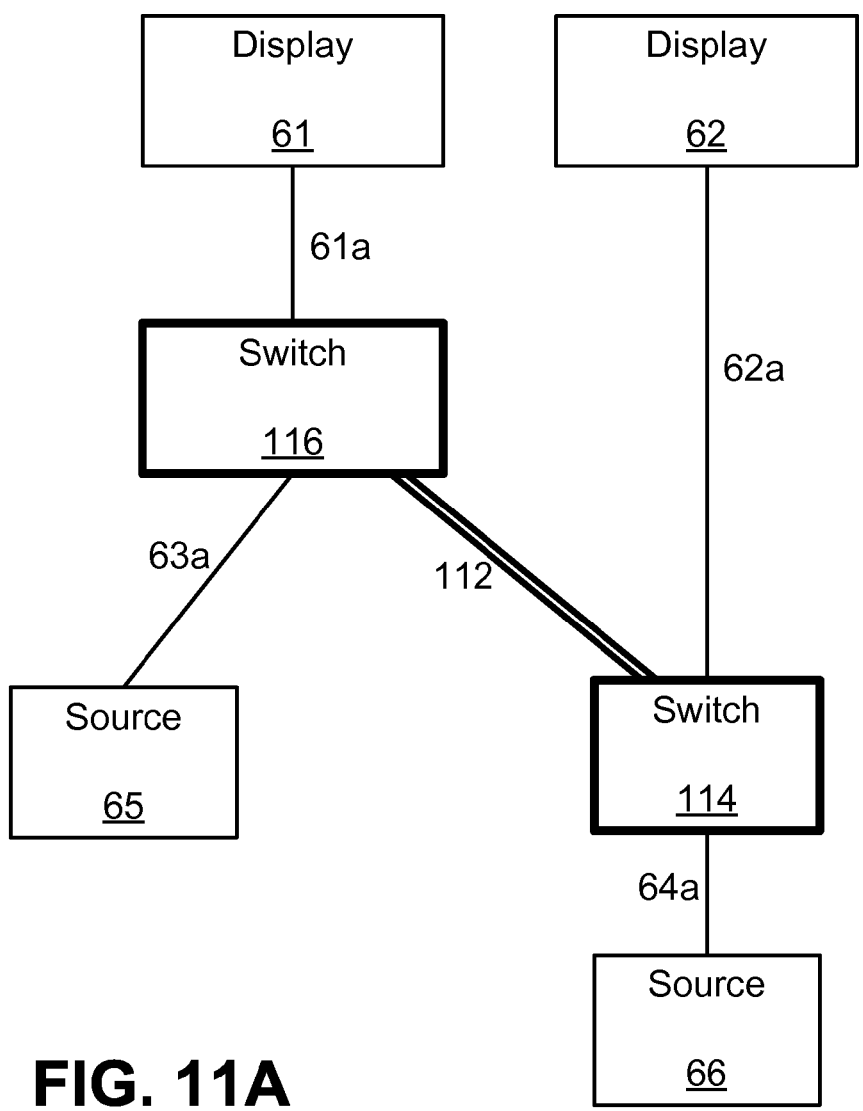
FIGS. 11A-11B illustrate symmetric communication channels in accordance with one embodiment of the invention.
Figure 11B:
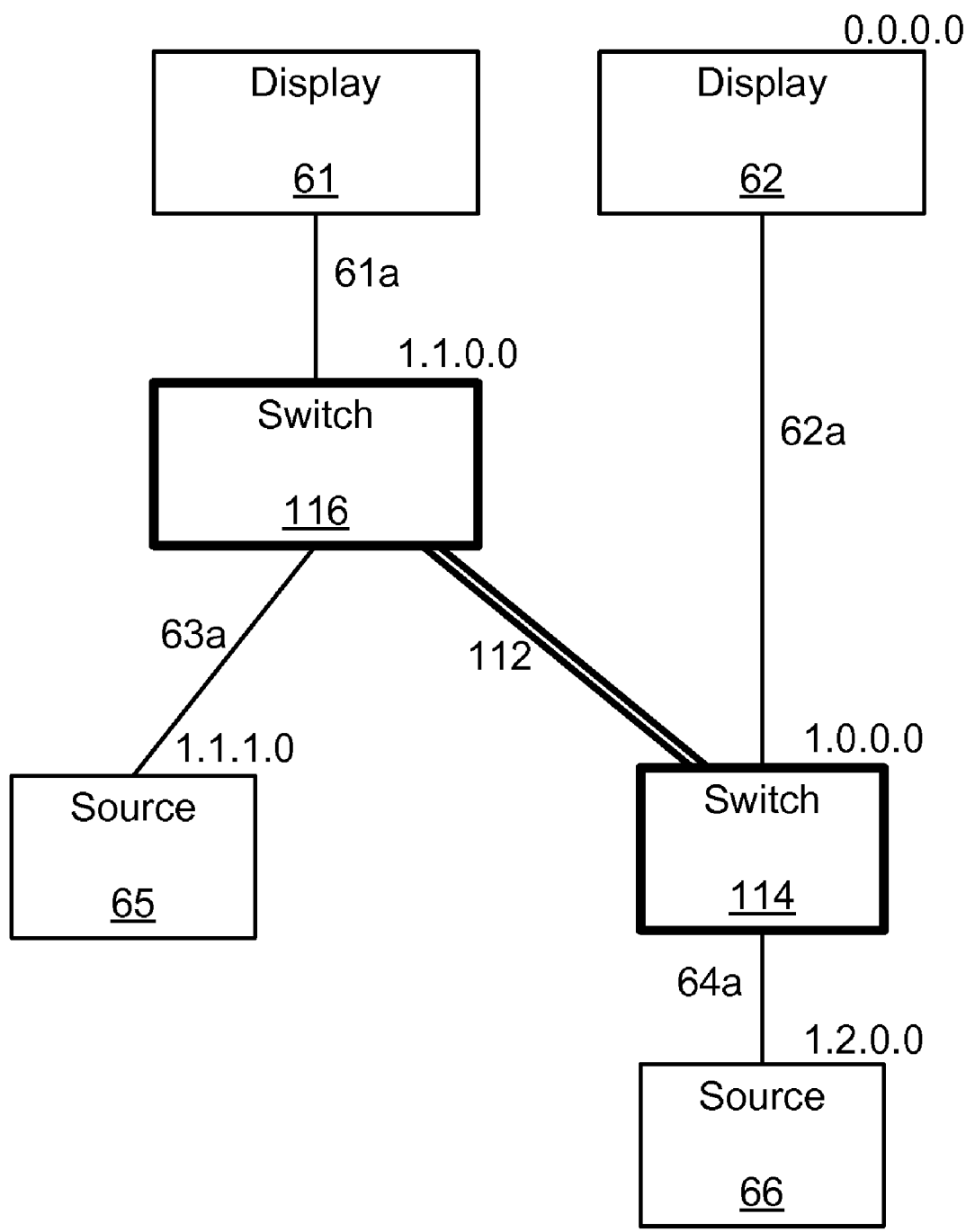

FIG. 11A illustrates a symmetric communication channel 112 connecting between the manipulating switches 114 and 116. If the symmetric communication channel 112 was a unidirectional communication channel and not a symmetric communication channel, display device 61 may have had access to source devices 65 and 66, while display device 62 may have had access only to source device 66. As a result of using the symmetric communication channel 112, display device 62 may also access source device 65. In the illustrated embodiment, the symmetric communication channel 112 does not influence the HDMI-CEC network view of display device 61. FIG. 11B illustrates the physical addresses allocated to the HDMI-CEC network view of display device 61. As illustrated, manipulating switch 114 may have manipulating switch 116 and source device 65 as its upstream devices. Therefore, manipulating switch 114 receives the physical address of (1.0.0.0), manipulating switch 116 receives the physical address of (1.1.0.0), source device 65 receives the physical address of (1.1.1.0), and source device 66 receives the physical address of (1.2.0.0).

It is to be understood that the symmetric channel may also be a multi-stream symmetric channel. A multi-stream symmetric channel may utilize the above described methods and devices for utilizing a multi-stream channel within an HDMI-CEC cluster trees, operating a multi-stream manipulating switch, calculating the residue bandwidth, ensuring enough bandwidth in advance, and/or operating a multi-stream daisy chain supporting HDMI-CEC.

Non-HDMI Cables

There are solutions for transmitting HDMI-CEC over non-standard HDMI cables, such as CAT5x, CAT6, coax, or fiber, wirelessly, or using any other solution that may be available today as well as in the future. The embodiments of the manipulating switch cover all of these alternative solutions and all of the alternative multimedia interfaces. For example, in FIG. 2, connection 12a may be an HDMI cable while connection 12b may be an optical fiber, 12c may be a CAT6 cable, 15a may be a coax cable, and 15b may be a wireless link. In other words, the various disclosed embodiments are not limited to some specific HDMI cable but may be implemented using any appropriate communication medium.

Figure 10:
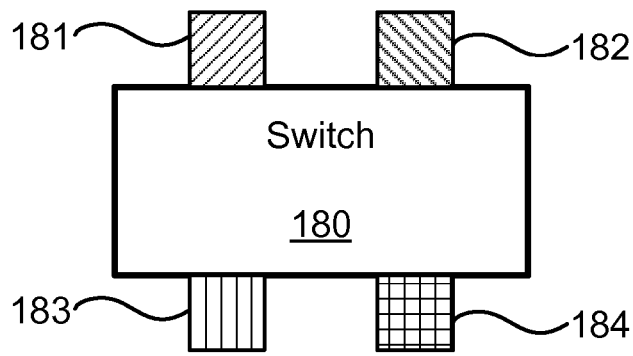
FIG. 10 illustrates a manipulating switch in accordance with one embodiment of the invention.

FIG. 10 illustrates a manipulating switch 180 having an HDMI cable input 183 that may be connected to an HDMI source device, a CAT5e input 184 that may be connected to an HDMI source device over a twisted pair system, wireless output 181 that may communicate with an HDMI display device over a wireless system and coax output 182 that may be connected to an HDMI display device over coax cable system.

Although the embodiments have been described in considerable detail with reference to certain embodiments thereof, other embodiments are possible.

Certain features of the embodiments, which may, for clarity, be described in the context of separate embodiments, may also be provided in various combinations in a single embodiment. Conversely, various features of the embodiments, which may, for brevity, be described in the context of a single embodiment, may also be provided separately or in any suitable sub-combination.

The embodiments are not limited in their applications to the details of the order or sequence of steps of operation of methods, or to details of implementation of devices, set in the description, drawings, or examples.

While the methods disclosed herein have been described and shown with reference to particular steps performed in a particular order, it will be understood that these steps may be combined, sub-divided, or reordered to form an equivalent method without departing from the teachings of the embodiments. Accordingly, unless specifically indicated herein, the order and grouping of the steps is not a limitation of the embodiments.

Any citation or identification of any reference in this application shall not be construed as an admission that such reference is available as prior art to the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents. In the claims, means-plus-function clauses are intended to cover the structures described herein as performing the recited function and not only structural equivalents, but also equivalent structures.

What is claimed is:

1. A method for assigning a required High Definition Multimedia Interface (HDMI) physical address to an HDMI Consumer Electronics Control (HDMI-CEC) device within a network including at least two HDMI-CEC display devices connected with partially overlapped HDMI-CEC cluster trees, comprising:
   determining by a manipulating switch the required HDMI physical address to be assigned to an upstream HDMI-CEC device, wherein the required HDMI physical address is different from true HDMI physical address that should have been assigned according to standard HDMI procedure for computing an HDMI physical address;
   removing and restoring a Hot Plug Detect (HPD) signal to the upstream HDMI-CEC device in order to cause the upstream HDMI-CEC device to read a modified Extended Display Identification Data (EDID); and
   providing the required HDMI physical address to the upstream HDMI-CEC device.

2. The method of claim 1, wherein the step of providing the required HDMI physical address to the upstream HDMI-CEC device comprises placing the HDMI physical address in an Extended Display Identification Data (EDID) to be transferred to the upstream HDMI-CEC device.

3. The method of claim 1, further comprising manipulating a non-physical address content of the EDID.

4. The method of claim 3, wherein the non-physical address content comprises video formats.

5. The method of claim 1, wherein the required HDMI physical address eliminates one or more hierarchic levels from an HDMI-CEC network view of an HDMI-CEC display device.

6. A method for operating a network comprising:
   a manipulated switch comprising at least one input port coupled to an upstream High Definition Multimedia Interface-Consumer Electronics Control (HDMI-CEC) cluster tree, and a first and second output ports, each port coupled to a downstream HDMI-CEC cluster tree comprising an HDMI-CEC display device;

reading physical addresses of the first and second output ports from their coupled downstream HDMI-CEC cluster trees;

checking whether a number of non-zero HDMI physical address nibbles received by one of the output ports is fully contained in the non-zero HDMI physical address nibbles received by the other output port;

if fully contained, exposing to the upstream HDMI-CEC cluster tree one of said physical address beginning with a longer non-zero HDMI physical address nibbles received by the output ports;

whereby HDMI physical addresses generated by the upstream cluster tree are consistent in the HDMI-CEC network views of the downstream cluster trees.

7. The method of claim 6, further comprising identifying a set of CEC logical addresses to be assigned to the HDMI-CEC devices in at least one upstream HDMI-CEC sub cluster tree of the manipulating switch, whereby said set of CEC addresses are consistent in the HDMI-CEC network views of the first and the second HDMI-CEC display devices.

8. The method of claim 6, further comprising identifying a set of CEC logical addresses to be assigned to the HDMI-CEC devices in all of the upstream HDMI-CEC sub cluster trees of the manipulating switch, whereby these addresses will be consistent in the HDMI-CEC network views of the first and the second HDMI-CEC display devices.

9. The method of claim 6, further comprising transmitting spoofed CEC <report physical address> messages to the devices coupled to the downstream HDMI-CEC output ports of the manipulating switch.

10. The method of claim 6, wherein the HDMI physical addresses to be assigned eliminate one or more hierarchic levels from at least one of the HDMI-CEC network views.

11. A method for assigning a required Consumer Electronics Control (CEC) logical address to an HDMI-CEC source device in a network including at least two HDMI-CEC sink devices associated with at least two partially overlapped HDMI-CEC cluster trees, comprising:

determining the required CEC logical address to be acquired by the HDMI-CEC source device;

reinitializing the HDMI-CEC source device to acquire a CEC logical address utilizing polling messages via removing and restoring a Hot Plug Detect (HPD) signal to an appropriate HDMI-CEC sub cluster tree which includes the HDMI-CEC source device;

emulating the HDMI-CEC source device thereby notifying an appropriate one of the at least two HDMI-CEC display device on the required CEC logical address of the HDMI-CEC source device; and spoofing acknowledgements to polling messages containing a spoofed CEC logical addresses other than the required CEC logical address.

12. The method of claim 11, wherein the step of notifying the appropriate HDMI-CEC display device utilizes a spoofed CEC <Report Physical Address> message.

13. A method comprising:

dividing, by a manipulating switch, a plurality of High Definition Multimedia Interface-Consumer Electronics Control (HDMI-CEC) devices into at least a first HDMI-CEC cluster tree coupled to a first HDMI-CEC display device, and a second HDMI-CEC cluster tree coupled to a second HDMI-CEC display device, wherein the HDMI-CEC cluster trees partially overlap;

determining a first and a second HDMI-CEC network view for the first and the second HDMI-CEC display devices, whereby the two HDMI-CEC network views partially overlap;

emulating an HDMI-CEC source device thereby notifying an appropriate one of the at least two HDMI-CEC display device on a required CEC logical address of the HDMI-CEC source device; and enabling a second HDMI-CEC source device in the second HDMI-CEC cluster tree spoofs acknowledgements to CEC polling messages containing non-required CEC logical addresses to acquire a required CEC logical address already in use by a first HDMI-CEC source device in the first HDMI-CEC cluster tree, wherein the first and the second HDMI-CEC source devices are located in non-overlapping parts of the HDMI-CEC network views.

14. The method of claim 13, further comprising acquiring downstream HDMI-CEC network views of the manipulating switch and utilizing the downstream HDMI-CEC network views of the manipulating switch for determining at least one CEC logical address to be assigned to at least one upstream HDMI-CEC device of the manipulating switch.

\* \* \* \* \*